(12) United States Patent
Jitaru

(10) Patent No.: US 11,929,665 B2
(45) Date of Patent: Mar. 12, 2024

(54) ENERGY EXTRACTION FROM THE PARASITIC ELEMENTS IN POWER CONVERTERS

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

(21) Appl. No.: 18/373,590

(22) Filed: Sep. 27, 2023

(65) Prior Publication Data

US 2024/0022162 A1 Jan. 18, 2024

Related U.S. Application Data

(60) Continuation-in-part of application No. 18/233,315, filed on Aug. 12, 2023, and a continuation-in-part of application No. 18/199,959, filed on May 21, 2023, which is a continuation of application No. 17/495,170, filed on Oct. 6, 2021, now Pat. No. (Continued)

(51) Int. Cl.

| | |
|---|---|
| *H02M 1/08* | (2006.01) |
| *H02M 1/42* | (2007.01) |
| *H02M 3/155* | (2006.01) |
| *H02M 3/335* | (2006.01) |
| *H01F 38/42* | (2006.01) |

(Continued)

(52) U.S. Cl.
CPC ......... *H02M 1/083* (2013.01); *H02M 1/4258* (2013.01); *H02M 3/155* (2013.01); *H02M 3/335* (2013.01); *H02M 3/33553* (2013.01);

*H02M 3/33592* (2013.01); *H01F 38/42* (2013.01); *H02M 1/0058* (2021.05); *H02M 1/342* (2021.05); *Y02B 70/10* (2013.01)

(58) Field of Classification Search
CPC .. H02M 1/083; H02M 1/4258; H02M 1/0058; H02M 1/342; H02M 3/155; H02M 3/335; H02M 3/33553; H02M 3/33529; H01F 38/42; Y02B 70/10

See application file for complete search history.

(56) References Cited

U.S. PATENT DOCUMENTS 5,736,842 A * 4/1998 Jovanovic ......... H02M 3/33576
363/21.04
6,522,108 B2 2/2003 Prager et al.

* cited by examiner

*Primary Examiner* — Emily P Pham
(74) *Attorney, Agent, or Firm* — Thomas W. Galvani, P.C.; Thomas W. Galvani

(57) ABSTRACT

A switching power conversion apparatus for converting power from an input voltage source to a load includes first and second switches connected to a switching node. An inductive element has a magnetizing current connected to the node, and the inductive element is connected to deliver energy via the first and second switches from the input voltage to the load during a succession of power conversion cycles. A capacitance connected to the node resonates with the inductive element to cause parasitic oscillation. A clamp subcircuit across the inductive element contains an auxiliary switch to trap energy and prevent parasitic oscillation, wherein the auxiliary switch is complementary to the first switch. A controlled voltage source injects energy in the inductive element, when the auxiliary switch turns off to discharge the parasitic capacitance by using trapped energy in the inductive element in addition to injected energy from the controlled voltage source.

24 Claims, 28 Drawing Sheets

Related U.S. Application Data

11,671,027, said application No. 18/233,315 is a continuation of application No. 17/495,245, filed on Oct. 6, 2021, now Pat. No. 11,728,723, said application No. 17/495,170 is a continuation of application No. 16/751,747, filed on Jan. 24, 2020, now Pat. No. 11,165,360, which is a continuation of application No. 16/503,432, filed on Jul. 3, 2019, now Pat. No. 10,574,148, said application No. 17/495,245 is a division of application No. 15/825,647, filed on Nov. 29, 2017, now Pat. No. 11,152,847.

(60) Provisional application No. 63/578,130, filed on Aug. 22, 2023, provisional application No. 63/377,229, filed on Sep. 27, 2022, provisional application No. 62/429,373, filed on Dec. 2, 2016.

(51) Int. Cl.
*H02M 1/00* (2006.01)
*H02M 1/34* (2007.01)

Controlled Energy Preservation Module (CEPM)

$$W_p = \frac{1}{2} C_p (V_{in}^2 - V_o^2)$$

Fig. 3C $$W_{pBulk} = \frac{1}{2} (C_{p1} + C_{p2})(2V_o)^2$$

Fig. 5C $$W_{p\,Flyback} = \frac{1}{2} C_p [(V_{in} + N * V_o)^2 - V_o^2]$$

Fig. 6C $$W_{p-TT\,forward} = \frac{1}{2}(C_{p1} + C_{p2})\left(\frac{V_{in}}{2}\right)^2$$

Fig. 9C1

$$I_{Mx} = \frac{1}{2} * \frac{V_{in}}{\sqrt{\frac{L_p}{C_{p1} + C_{p2}}}}$$

Fig. 9C2

ENERGY EXTRACTION FROM THE PARASITIC ELEMENTS IN POWER CONVERTERS

CROSS-REFERENCE TO RELATED APPLICATIONS

This application is a continuation in part of and claims the benefit of prior U.S. patent application Ser. No. 18/233,315 filed Aug. 12, 2023, is a continuation in part of and claims the benefit of prior U.S. patent application Ser. No. 18/199,959 filed May 21, 2023, and claims the benefit of prior U.S. Provisional Application No. 63/377,229 filed Sep. 27, 2022, and of prior U.S. Provisional Application No. 63/578,130 filed Aug. 22, 2023.

FIELD

The present specification pertains to electronic devices employing a power converter configured around the topologies used in power converters.

BACKGROUND

All the topologies utilized in power conversion, naming just several, buck, boost, flyback, half bridge, half bridge derivative, full bridge and full bridge derivative, contain switching devices connected to switching nodes. In FIG. 1 is presented such a switching device connected to a switching node. A capacitance C, 120 is connected to the switching node, regardless of the type of the switching device. To the switching node other devices are connected such additional switching devices such as Sn,130 and inductive elements such as Ln,140. The specific inductive element Ln has two terminations, terminal W1, 4100 of the inductive elements connected to the switching node, and the second terminal of said inductor element, labeled, W2, 4110.

During the time all the switching devices connected to the switching node are off, the inductive elements connected to the switching node which form a resonant circuit with the parasitic capacitance C,120 and parasitic oscillations do occur in the switching node. This period is referred to as "dead time". The oscillations which occur during the dead time are named, "parasitic oscillations" and the energy contained in the "parasitic oscillations energy" is named the "parasitic energy".

This specification will present a solution of extracting the "parasitic energy" which is the energy contained in the resonant elements connected to the switching node and as a result eliminating these oscillations. In the prior art a significant portion of this energy is dissipated due to conduction and inductive element magnetic core loss. In addition to that the "parasitic oscillations" will inject noise into the components placed near the resonant elements. This specification presents solutions in harvesting the energy of the "parasitic oscillations" and use that energy for improving the power conversion efficiency, such as creating zero voltage switching conditions on the switching elements, this being one of the embodiments of this specification. One Prior Art solution to eliminate the oscillation in the switching nodes is presented in U.S. Pat. No. 6,522,108B2. In this specification Prager presents a unidirectional switch which is placed across the inductive element connected to the switching node as is depicted in FIG. 2A. In FIG. 2B are depicted the key waveforms of circuit from FIG. 2A.

The Prager' patent presents a solution designed to eliminate the ringing but does not offer a solution in using this energy to obtain zero voltage switching conditions for the switching elements.

In FIG. 3A is presented a boost topology and in FIG. 3B are presented the key waveforms of a boost converter. The boost topology contains an inductive element L, 220, a switching element, M1,210, across which there is a parasitic capacitance Cp,300, parasitic capacitance being the summation of the parasitic capacitance of the semiconductor, device used as a switch, together with the parasitic capacitance reflected from the inductor element L and the rectifier means Do, 240. The boost topology contains further a rectifier means, Do, and the output load which is formed by an output capacitor Co, 250 and an output loan $R_{load}$, 330.

In between t0 to t1, the main switch M1, is turned on by the control signal VcM1, 270, and during this time the current through L,220, builds up reaching a peak current Ipk, 360. During this time interval, energy is accumulated in the inductive element L.

At t1, the switch M1, 210, is turned off and the energy stored in between t0 to t1 is delivered to the "output load" formed by Co, 250 and the load, $R_{load}$, 330. As the energy is transferred to the output load, the current through the inductive element is decreasing with a rate given by the difference (Vo−Vin) and the inductance of L, 220. At t2, the current through Do, 240 will reach zero, which means that all the energy stored in L, 220, is delivered to the output load.

In between t2 to t3, referred also as the dead time, "parasitic oscillations" will occur in the switching node, A, 280, depicted by V(M1) waveforms. The oscillations do have peaks, Vpk, 340 and valleys, Vv,350. These oscillations do reflect also in the current through L, 220 which is depicted by the $I_L$ waveforms, 290. The "parasitic oscillations" are caused by the resonant circuit formed by the inductive element L, 220 and the parasitic capacitance Cp, 300. Said resonant circuit is energized by the energy defined by the formula presented in FIG. 3C.

In the case wherein the boost converter is used in Power Factor Correction (PFC) application, the Wp can be quite significative at low AC input voltage, in PFC application wherein Vin=127 Vdc (90 Vac) and 400V output. For a parasitic capacitance Cp=100 pF the Wp energy is 7.19 uJ. For an operation frequency of 150 Khz the power dissipation in the parasitic ringing, if dissipated and not extracted, can reach 1 W.

This specification presents a method of extracting this energy and use that energy for other purposes. One of the preferred embodiments is using this energy to obtain zero voltage switching conditions for the main switch, M1, 210.

In the prior art presented in U.S. Pat. No. 6,522,108B2, the parasitic oscillations are eliminating by creating a short circuit across the inductive element and store that energy through the magnetizing current of the inductive element. In FIG. 2A the short is created by the switch Rs,30 and the diode 32. Preserving "parasitic oscillation" by shorting an inductive element has the disadvantage of dissipation of some of the energy through the conduction in the inductive element and the unidirectional switch formed by Rs,30 and diode 32. For a larger "dead time", defined by the time difference t3−t2, this prior art method depicted in FIGS. 2A and 2B is not efficient and a good portion of the energy would be dissipated in conduction. In this U.S. Pat. No. 6,522,108B2 prior art the "parasitic oscillation" energy is not used for other purposes such as obtaining zero voltage switching conditions for the switching elements. This drawback is eliminated by Jitaru in U.S. Pat. No. 11,152,847, wherein additional energy is injected to achieve zero voltage switching on the switching elements, this patent application is a continuation in part. In Jitaru U.S. Pat. No. 11,152,847 zero voltage switching on the switching elements is obtained but it is not the most efficient solutions especially for a larger "dead time".

BRIEF DESCRIPTION OF THE DRAWINGS

Referring to the drawings:

FIG. 3C presents the formula for the energy contained in the parasitic oscillation of a boost topology.

FIG. 5C presents the formula for energy contained in the parasitic oscillations.

FIG. 6C presents the formula calculating the energy in the parasitic oscillation of the flyback topology.

FIG. 9C1 presents the formula of the parasitic energy in two transistors forward topology.

FIG. 9C2 presents the formula for the peak negative magnetizing current in the circuit from FIG. 9A.

DETAILED DESCRIPTION

In this specification, two modules are introduced. The first module depicted in FIG. 1B, 612, is referred to as "Controlled Energy Preservation Module", CEPM. It has two power terminations A, 4000 and B, 4010, and a signal connection, Cy, 4090.

The CEPM, 612 is composed by a unidirectional switch formed by diode D2, 520, and a controlled switch Sy, 4020, and a controlled voltage source, Vvinjc, 4033. All these three said components are placed in series in any order. The presence of Vvinj,4033, allows an injection of energy for a given purpose into the power converter wherein the CEPM, 612, module is connected. The said purpose is to obtain zero voltage switching on the switching elements.

The switch Sy, 4020, is controlled by the signal Vcsy, 4400 which is connected to the signal connection Cy, 4090.

Figure 3A:
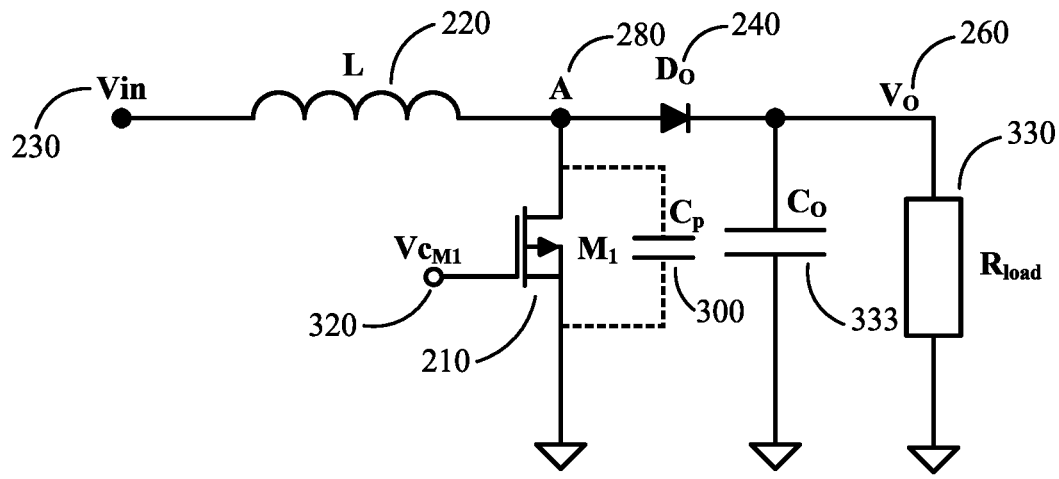
FIG. 3A depicts a conventional boost topology.
Figure 3B:
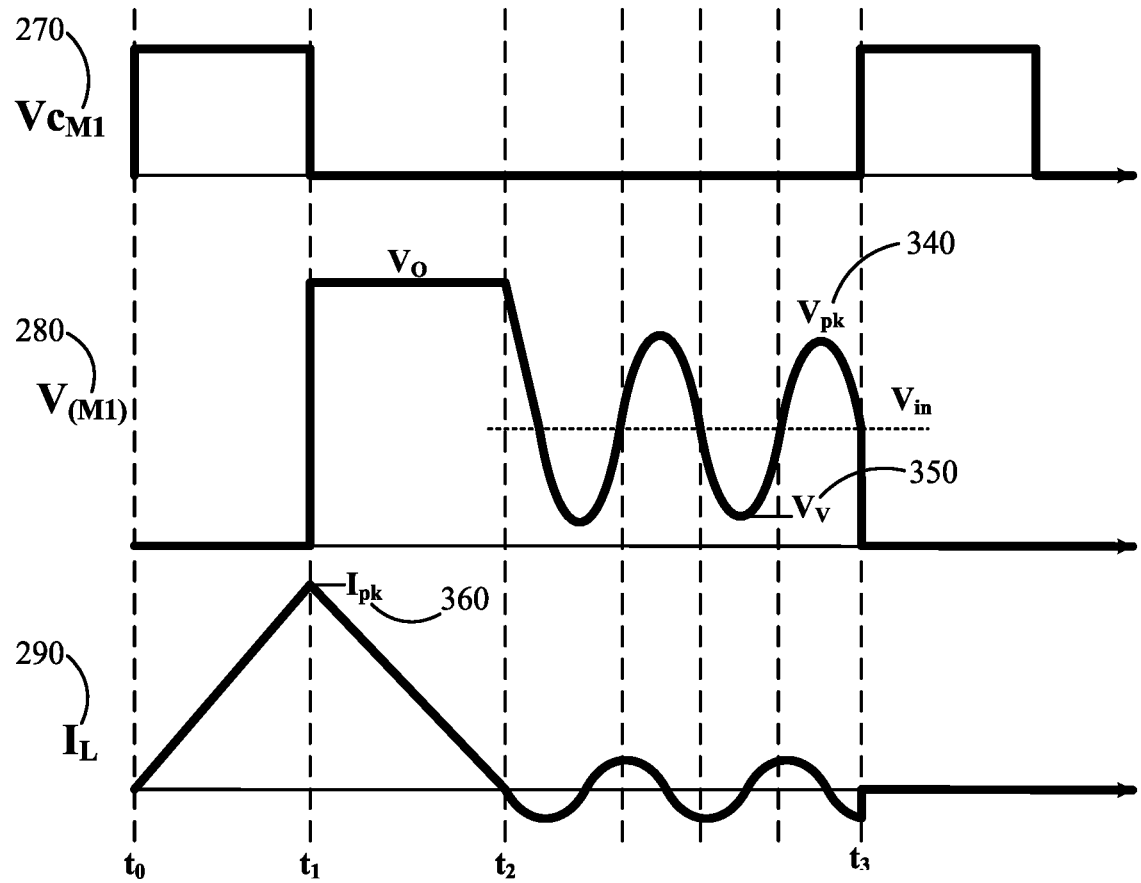
FIG. 3B depicts the key waveforms from the circuit presented in FIG. 3A
Figure 3D:
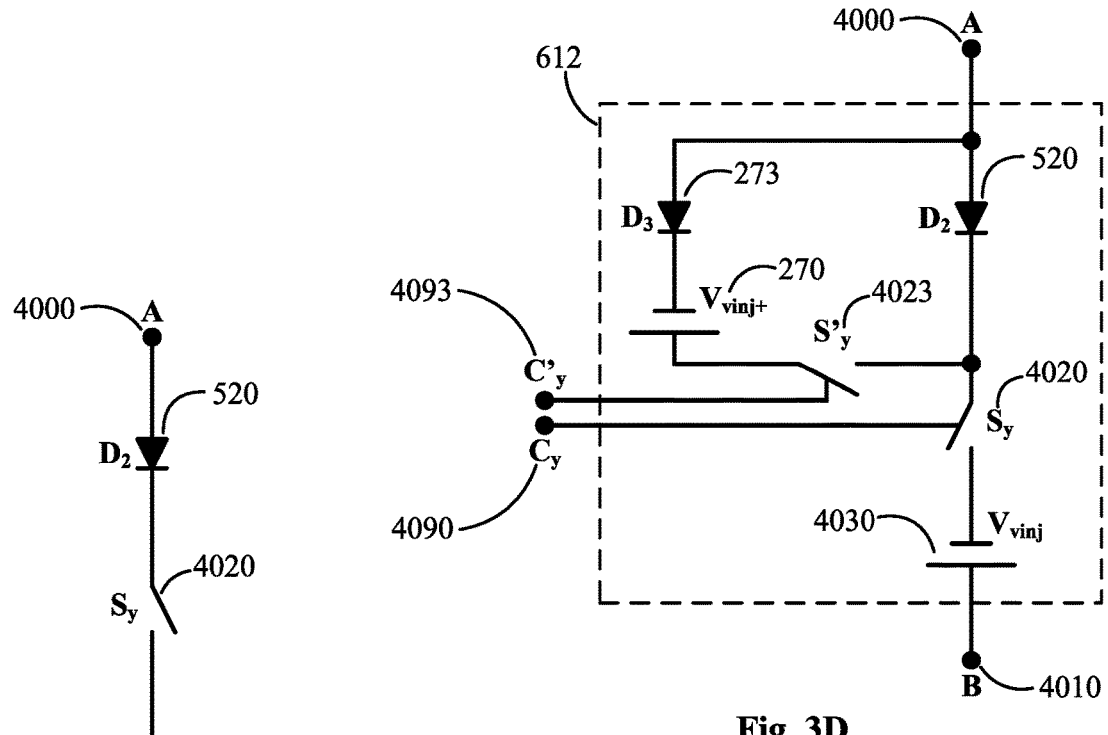
FIG. 3D depicts a potential implementation of the circuit presented in FIG. 1B.
Figure 3E:
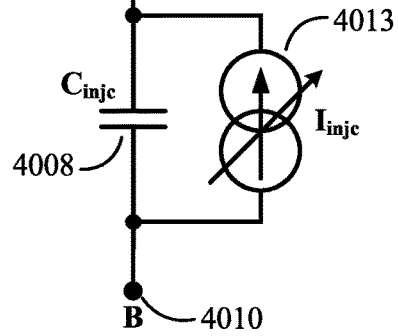
FIG. 3E depicts another potential implementation of the circuit presented in FIG. 1B.
Figure 3F:
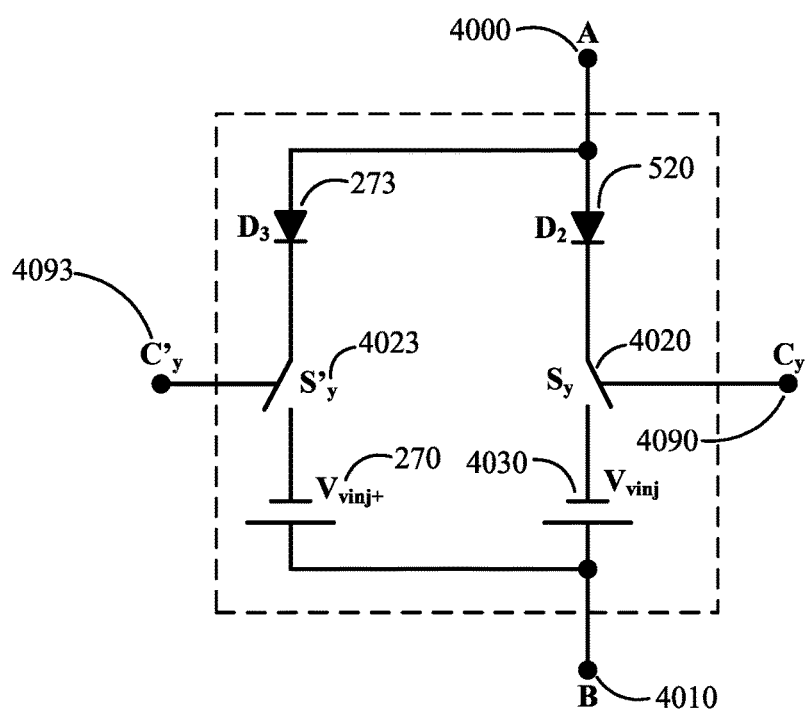
FIG. 3F depicts another potential implementation of the circuit presented in FIG. 1B.

In FIG. 3D, FIG. 3E and FIG. 3F are depicted a possible implementations of the circuit from FIG. 1B wherein the Vinjc, 4033 can be modulated. When Sy' is closed the diode D2, 520 is turned off and the current from A to B would flow via D3, 273, Vinj+,270, and Vvinj, 4030. In conclusion the controlled voltage source Vinjc, 4033, from FIG. 1B, can have the value of Vvinjc as follows: when Sy' is open Vvinjc=Vvinj, and Vvinjc=(Vinj+Vinj+) when Sy' is closed. Vinj can have a value as low as zero.

In FIG. 3F when Sy is closed the Vinjc is Vvinj and when Sy' is closed and Vinj+ is larger than Vinj, the equivalent Vinjc is Vinj+. In FIG. 3E the implementation for Vinjc is a capacitor Cinjc charged by a current source Iinjc, 4013. In all these implementations the controlled voltage source Vinjc can be modulated as needed for a given application.

Figure 1A:
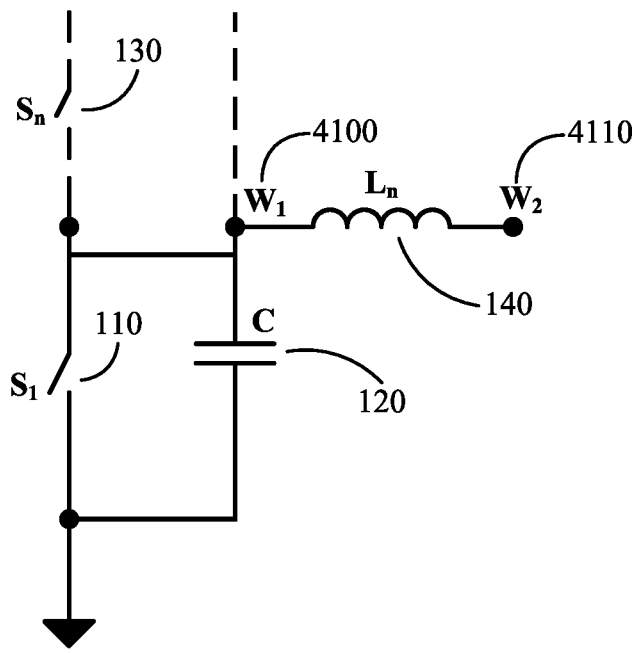
FIG. 1A depicts a switch node which is the building block of a power converter.
Figure 1B:
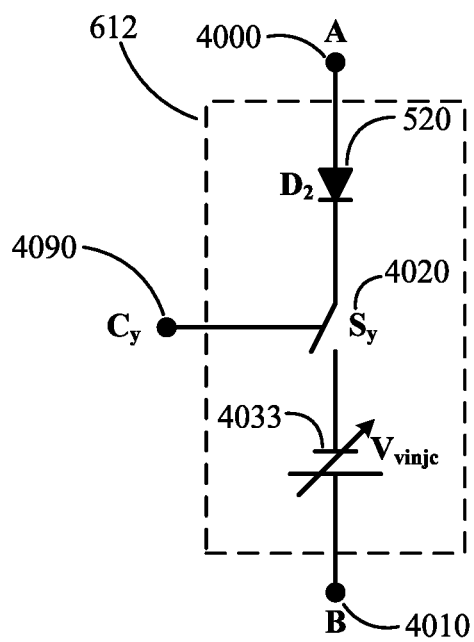
FIG. 1B depicts an intelligent clamp circuit.
Figure 1C:
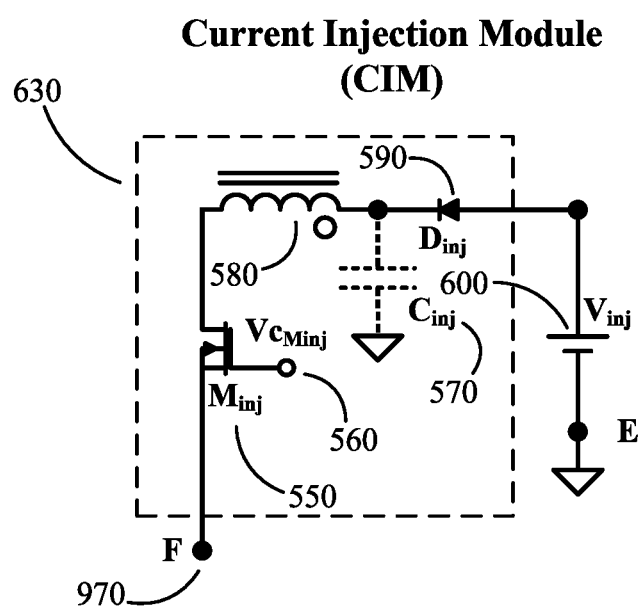
FIG. 1C depicts the current injection module.

In FIG. 1C is presented the Current Injection Module (CIM), 630 is a module which in some application may work together with CEPM, to guaranty zero voltage switching conditions in any operating conditions. The CIM module is formed by a coupled winding to the transformer wherein the CEPM module is attached and further containing a switching element Minj, 550, a diode Dinj, 590, an optional Cinj capacitor, 570, wherein the diode Dinj is connected to an external voltage source, Vinj. This circuit is presented in the U.S. Pat. No. 10,574,148, wherein this specification is a continuation in part.

Figure 4A:
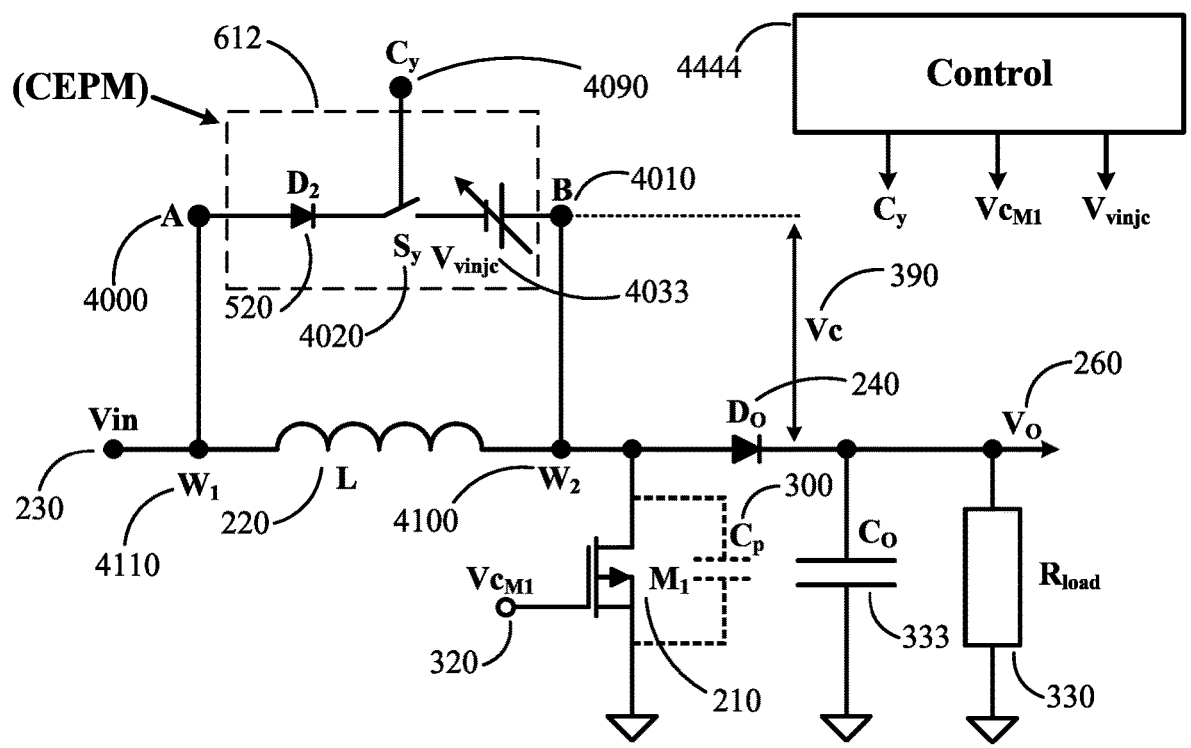
FIG. 4A depicts a buck topology using the clamp from FIG. 1B.
Figure 4B:
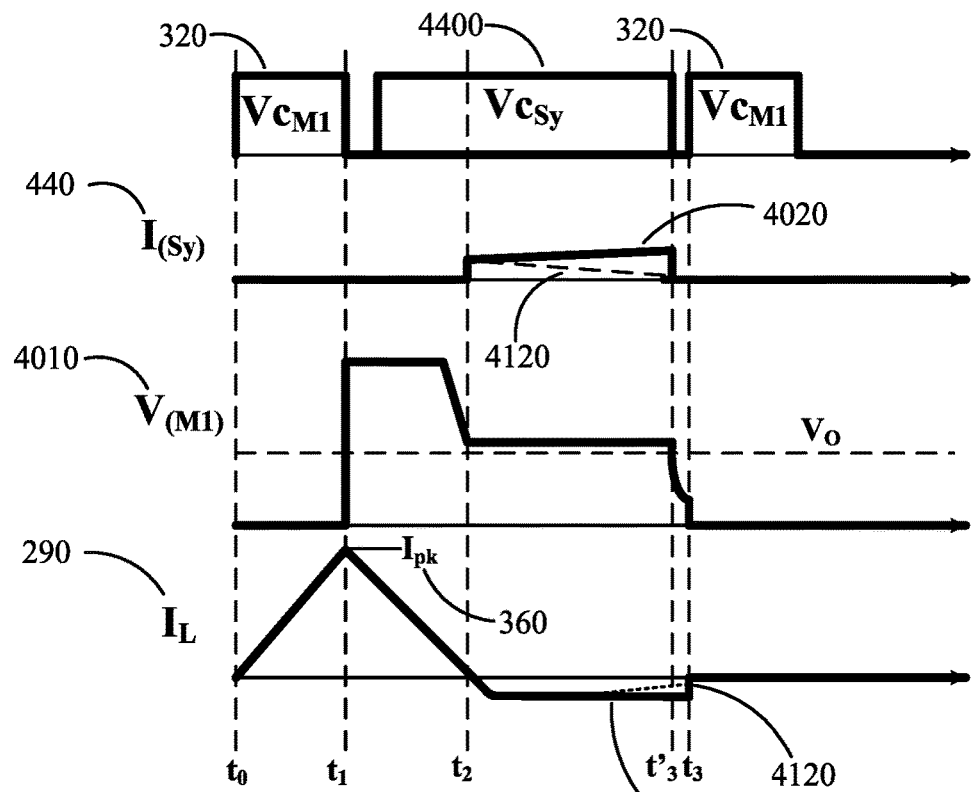
FIG. 4B depicts the key waveforms of the circuit from FIG. 4A.

In FIG. 4A is presented the boost topology using the CEPM module. The A termination of the EPM is connected to termination W1, 4110, of the inductive element L, 220, and the B termination of the CEPM module is connected to the W2, 4100, termination of the inductor L, 220. The control signal Vcsy, 4400 is connected to the connection Cy of the CEPM module. In FIG. 4B are depicted the key waveforms of the circuit depicted in FIG. 4A.

In between t0 to t1, the switch M1, is turned on by the signal VcM1, 320, and during this time the current through L,220, builds up reaching a peak current Ipk,360. During this time interval, energy is accumulated in the inductive element L. In this topology the first switch is M1, 210 and the second switch is Do, 240 and the Sy switch is complementary to the first switch.

At t1, the switch M1, 210, is turned off and the energy stored in between t0 to t1 is delivered to the output load. The current through L, 220 will reach zero at t2, which means that all the energy stored in L, 220, is delivered to the output load.

In between t2 to 3', is the period wherein the unidirectional switch formed by Sy and D2 together with Vvinjc creates a low impedance path across the inductive element L, 220. The parasitic energy contained in the parasitic oscillation is converted in magnetic energy via magnetizing current I(Sy), 440. With Vvinjc of zero value, the magnetizing current would decay towards zero, as depicted by 4120, due to the conduction losses. The value of Vvinjc will determine the magnetizing current shape during the t2 to t3'. The Vvinjc can be chosen, such as the amplitude of the magnetizing current through L, $I_L$, 290 to be constant during t2 to t3'. The Vvinjc can be also chosen such that the amplitude of the magnetizing current to increase during the period t2 to t3' and in this way having the necessary amplitude to discharge the voltage across Cp, 300 to zero between t3' to t3. For a large "dead time" this implementation, maintaining constant amplitude I(Sy), 440, will lead to a larger power dissipation in conduction.

Figure 4C:
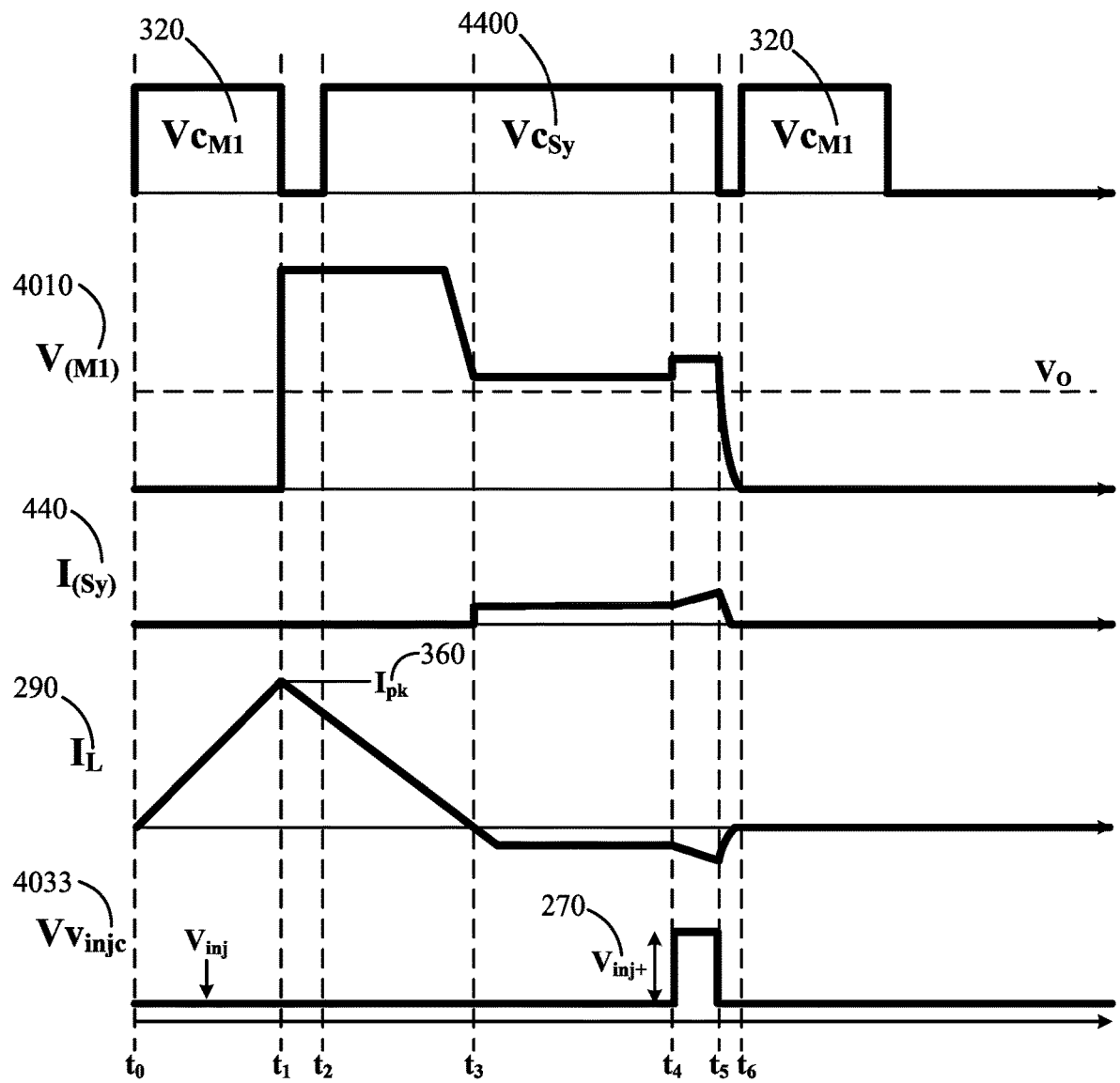
FIG. 4C depicts the key waveforms of the circuit from FIG. 4A with intelligent control of Vvinjc.

In FIG. 4C are depicted the key waveforms wherein intelligent control is used for driving the CEPM. The Vvinjc, 4033 can change and increase its amplitude at a given time before t5 such as t4, as presented in FIG. 4C. By increasing the Vvinjc amplitude at a given time prior t5 the magnetizing current $I_L$ would increase in a such way that between t4 and t5 will reach the necessary amplitude to do a full discharge of the Cp, 300, prior M1, 210 will turn on at t6 under zero voltage switching conditions.

In FIG. 4C are presented the control signal for M1, VcM1, 320, the control signal for Sy, Vcsy, 4400, the voltage across the main switch M1, V(M1), 4010, the current through Sy, I(Cy), 440, the current through L, $I_L$, 290, the Vvinjc, 4033.

In between t0 to t3 of FIG. 4C the mode of operation is the same as FIG. 4B mode of operation between t0 to t2. In FIG. 4C, at t3 the current through L, 220, reaches zero as is also presented in FIG. 4B at t2.

In FIG. 4C in between t3 to t4 the current through Sy, is presented as constant, though it can be also decaying in the event Vvinjc has a very low amplitude or even zero.

At t4 the voltage between A, 4000 and B, 4010 of the module CEPM increases from Vinj, to an additional Vinj+, 270. This increase is also visible on the voltage across M1, during t4 to t5 and as a result the current through Sy, starts increasing with a slope proportionate with the Vvinj+, 270.

The increased amplitude of the current through Sy, increases also the negative magnetizing current through I(L), 290 between t4 to t5.

At t5, the negative current through L, 220, has the necessary amplitude to discharge the parasitic capacitance Cp, 300 to zero after t5, when Sy, 4020, is turned off. As a result, the voltage across M1, 210, will be zero at t6, when M1, 210, turns on.

Using the CEPM module depicted in FIG. 4G, at t4, Sy' is turned on via the signal connection Cy' which turn on Sy', 4030 at t4 and turns it off at t5.

In this CEPM module depicted in FIG. 3D the Vvinjc will have a variable amplitude ranging from Vvinj to Vvinj+ Vvinj+. Modulating the equivalent Vvinjc will control the value of the current through Sy, 4020 and as a result the current through $I_L$, 290 to have the necessary amplitude at t5, from to discharge the parasitic capacitance across Cp, 300 to a desired value. In most of the applications the desired voltage value across Cp, is zero voltage at t6 as depicted in FIG. 4C.

The modulation of the equivalent Vvinj can be done in many other ways different of the implementation from FIG. 3D such as FIG. 3F and FIG. 3E.

In FIG. 1A there are two switchers, S1, 110 and Sn, 130. We introduce the concept of the first and second switch. The second switch is the switch which after turn off the parasitic oscillations start to occur. The first switch is the switch which is on prior the second switch and in between the first switch and second switch there is a small dead time. A small dead time is much shorter than the dead time wherein parasitic oscillations do occur.

For example, in the boost topology, the first switch is M1 and the second switch is Do.

Figure 5A:
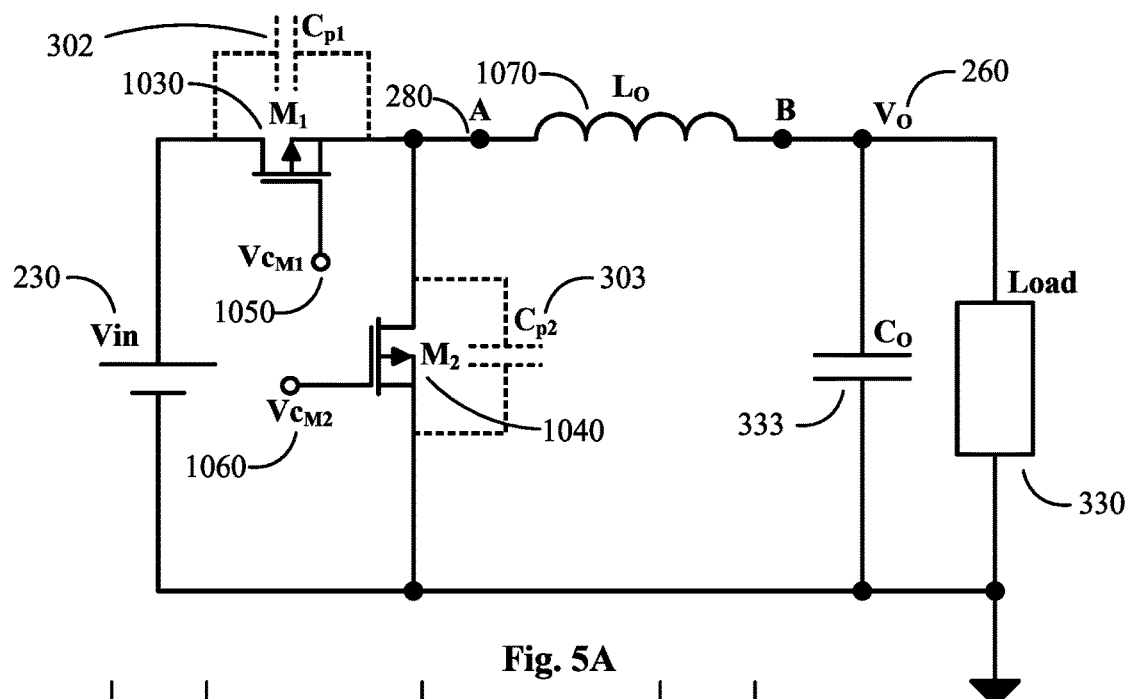
FIG. 5A depicts the conventional buck topology.

Parasitic oscillations do occur also to other topologies such as Buck Topology. In FIG. 5A is presented the buck topology and in FIG. 5B are presented the key waveforms associated with the buck topology from FIG. 5A.

Figure 5B:
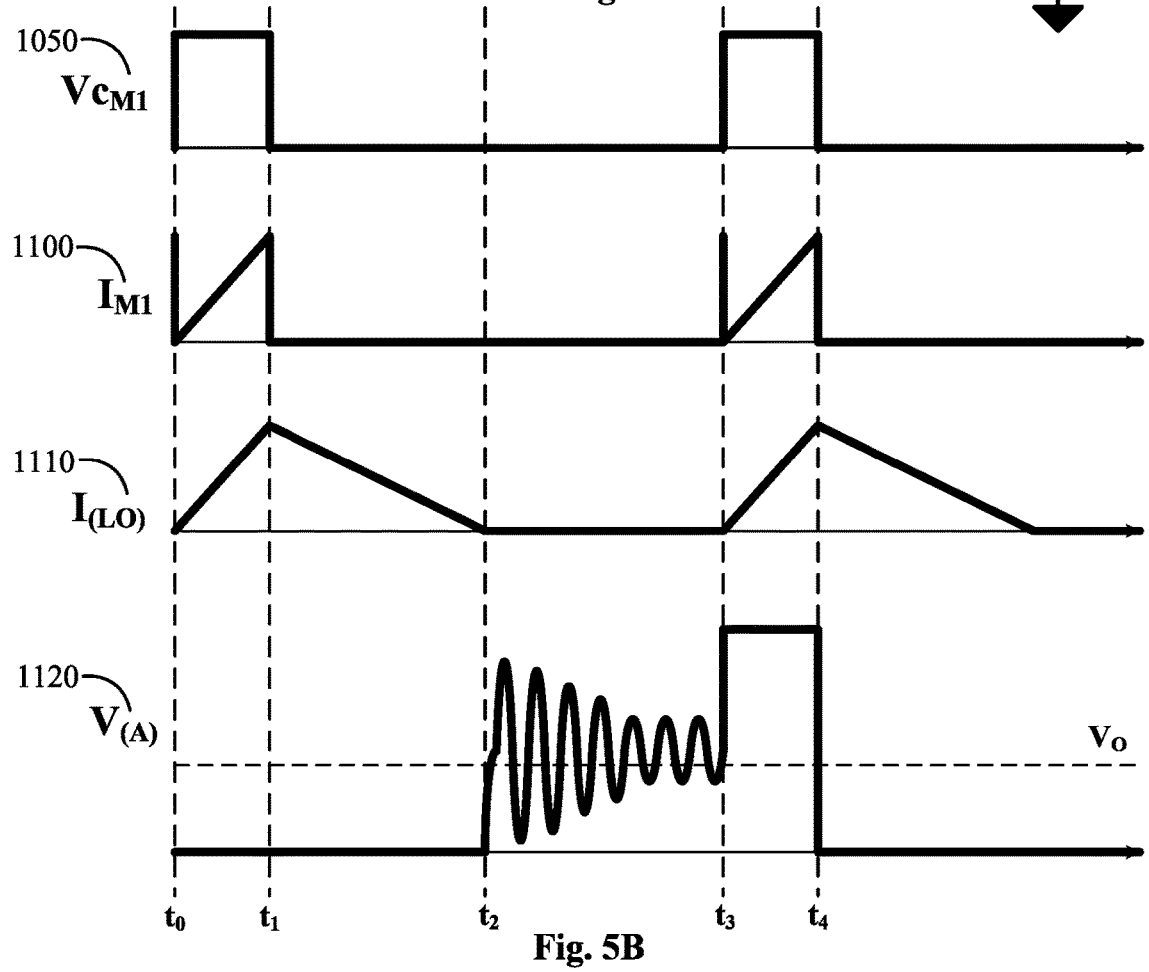
FIG. 5B depicts the key waveforms of the circuit presented in FIG. 5A.

The key waveforms depicted in FIG. 5B are: the control signal for M1, VcM1, 1050, the current through M1, IM1, 1100, the current through Lo, I(Lo), 1110, and the voltage in the switching node A, V(A), 1120.

Between t0 to t1 the switch M1, 1030, turns on and during this time interval the current builds up through M1, from zero to a peak current. As visible in FIG. 5B there is a spike of current which occurs at the turn on of M1, due to the discharge of the parasitic capacitance Cp1, 302, reflected across M1, 1030.

Between t1 to t2 the current through Lo, 1070, decreases with a slope proportionate to Vo/Lo. At t2 the current through Lo,1070, reaches zero which means that the energy injected in the magnetizing current of Lo is fully transferred to the load. I am defining as a load the output configuration connected to Vo, composed by the output capacitor Co, 333 and output load, 330.

In this topology the first switch is M1 and the second switch is M2.

The time in between t2 to t3 is referred as the dead time, time wherein neither of the switching elements, M1, 1030 and M2, 1040 is on. During the dead time the voltage in A,280 exhibits parasitic oscillation caused by the resonant circuit formed by the inductive element, Lo, 1070 and the parasitic capacitors across M1 and M2 which are in parallel. The parasitic oscillations are energized by $W_{pBuck}$, which is depicted in FIG. 5C.

Figure 5D:
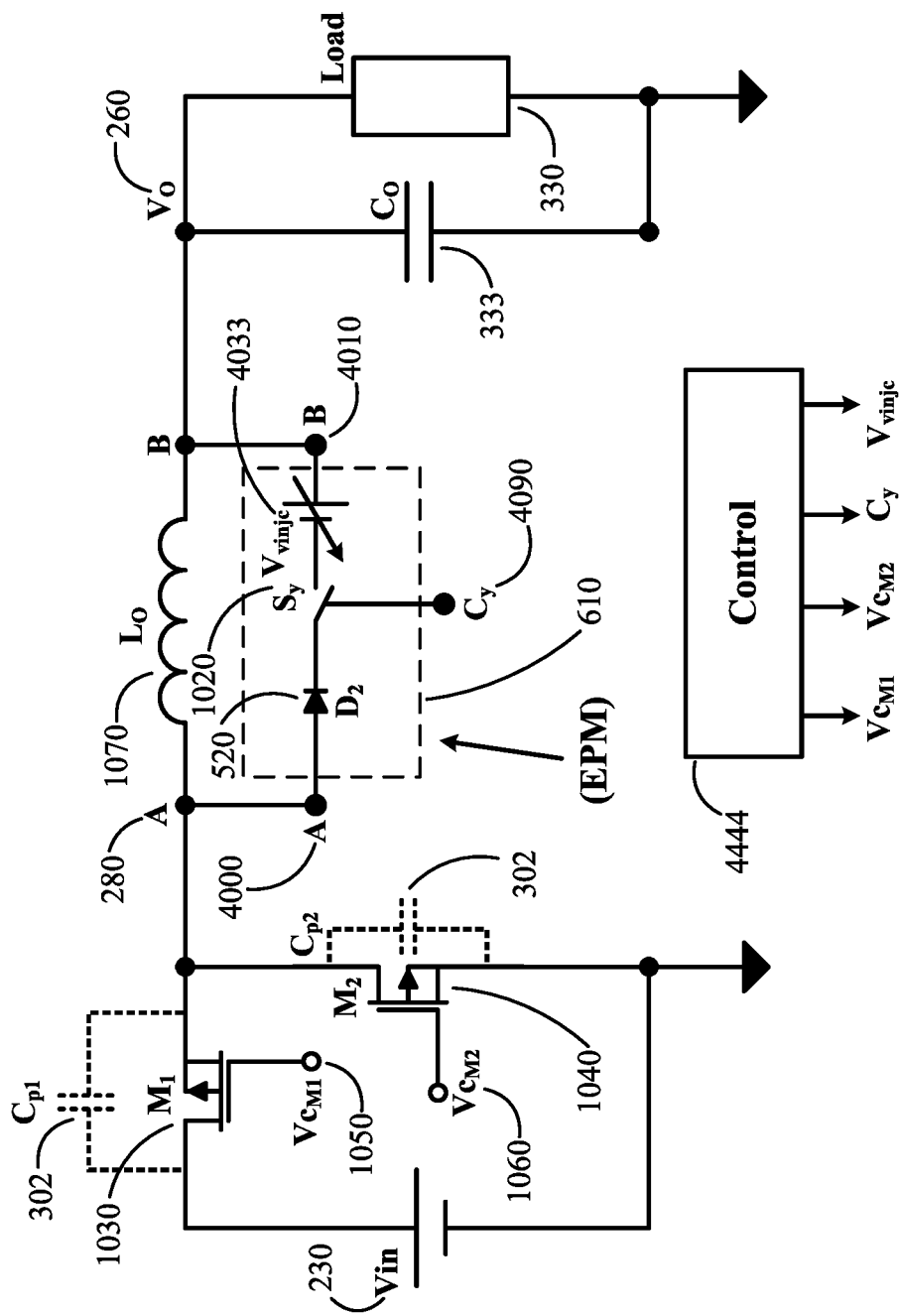
FIG. 5D presents the buck topology with the intelligent clamp circuit from FIG. 1B.
Figure 5E:
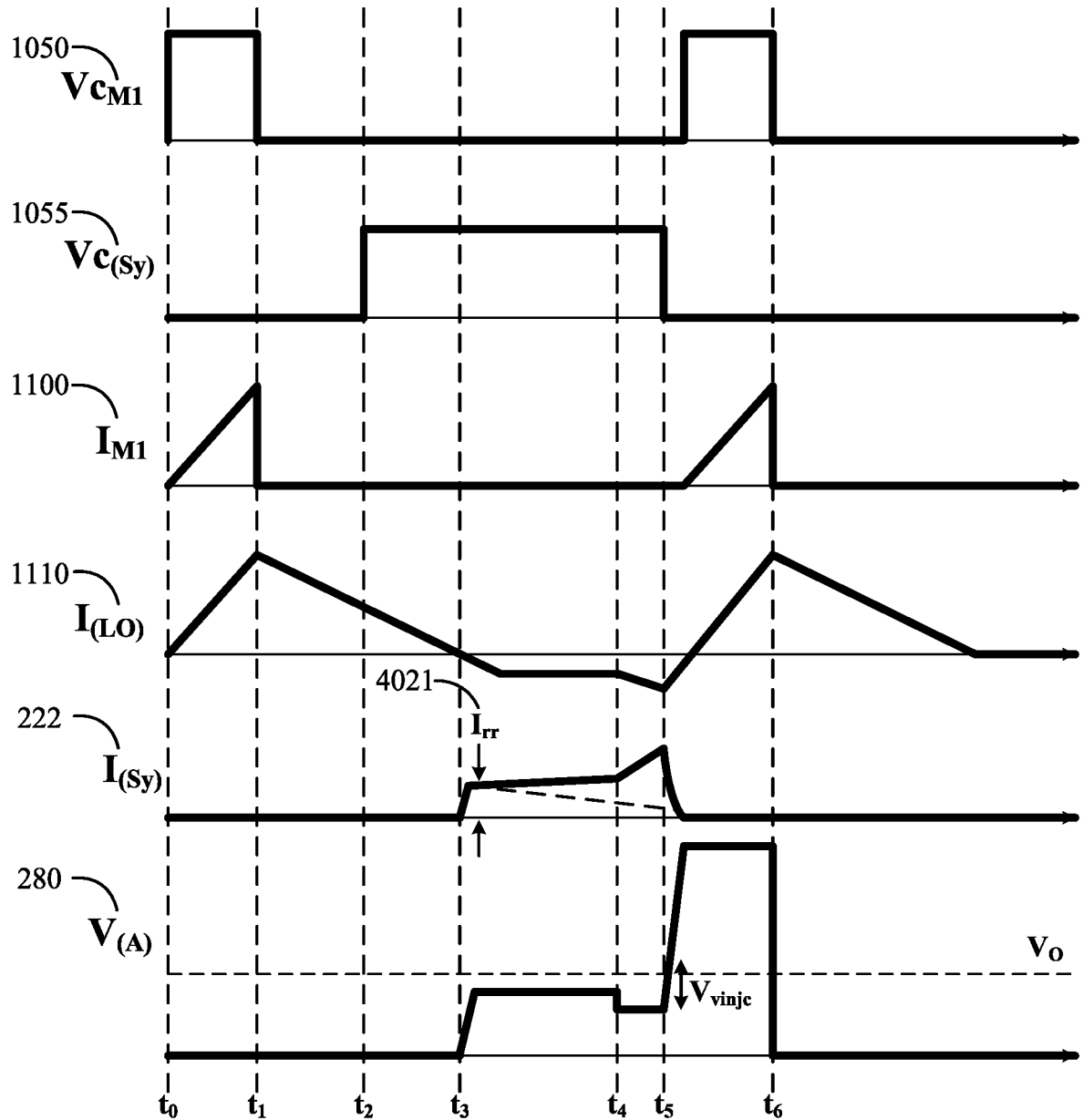
FIG. 5E presents the key waveforms for the circuit depicted in FIG. 5D.

In FIG. 5D is presented the buck topology using the module CEPM, and the key waveforms are depicted in FIG. 5E. The key waveforms depicted in FIG. 5E are: Control signal for M1, $Vc_{M1}$, 1050, the control signal for the Sy, $Vc_{Sy}$, the current through the main switch M1, the current, $I_{M1}$, 1100, the current through output inductor, I(Lo), 1110, the current through the switch Sy, 222, and the voltage in the switching node A, V(A), 280.

Between t0 to t1, M1, 1030 is on and the current build up through Lo, 1070. At t1 M1 turns off and the current flows further through Lo, through M2, decaying and reaching zero level at t3.

At t2 in between t1 to t3 the Sy switch turns on via the Vc(Sy),1055. As previously mentioned, the switch element of the module CEPM, (Sy) is complementary to the first switch (M1).

At t3 when the current through Lo reaches zero, the parasitic oscillation would start without the presence of the CEPM module.

In between t3 to t4 the voltage in the switching node A, will reach the level Vo-Vvinjc. Initially the energy WpBulk, presented in FIG. 5C will convert in magnetizing current, Irr, of Lo which will flow through Sy, during the interval, t3 to t4. In some applications Vvinjc will ensure that the amplitude Irr, will be maintained in between t3 to t4, the voltage across M1. The amplitude of Vvinjc can be tailored after t4, to reach a higher amplitude for the purpose to increase the negative magnetizing current of Lo, in such way to be able to discharge the parasitic capacitance reflected across M1, to zero shortly after t5, when the main switch M1 turns on. In between t4 to t5 Vcinjc will increase its amplitude and that is reflected in V(A), 280.

The time interval between t4 to t5 and the amplitude of Vvinjc will be tailored in such way that magnetizing current will be sufficient to fully discharge the parasitic capacitance reflected across M1 and achieve zero voltage switching conditions at the time M1 turns on. The designers has two parameters to control in order to obtain zero voltage switching on M1, one being the amplitude of Vvinjc and the time interval between t4 to t5. In most of applications Vvinjc is constant and the time difference between t4 to t5 can be easily controlled digitally.

Figure 6A:
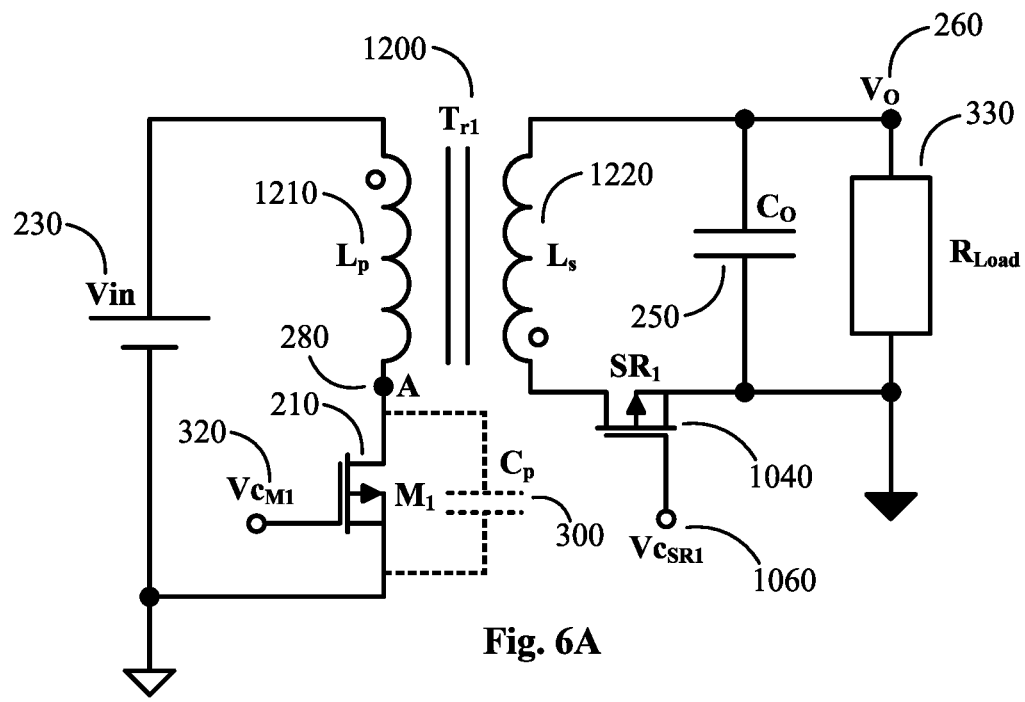
FIG. 6A presents the flyback topology.

Parasitic oscillations do occur also in other topologies such as isolated topologies including the flyback topology. In FIG. 6A is presented an isolated flyback topology. An isolated flyback topology has a primary and a secondary. In the primary section there is an input voltage source, Vin, 230, a transformer Tr1, 1200 having a primary winding Lp, 1210 and a secondary winding Ls, 1220, and a primary switch M1, 210. The secondary circuit contains a secondary switch SR1, 1040 and the output load composed by an output capacitor Co, 250 in parallel with an output load, $R_{Load}$, 330.

Figure 6B:
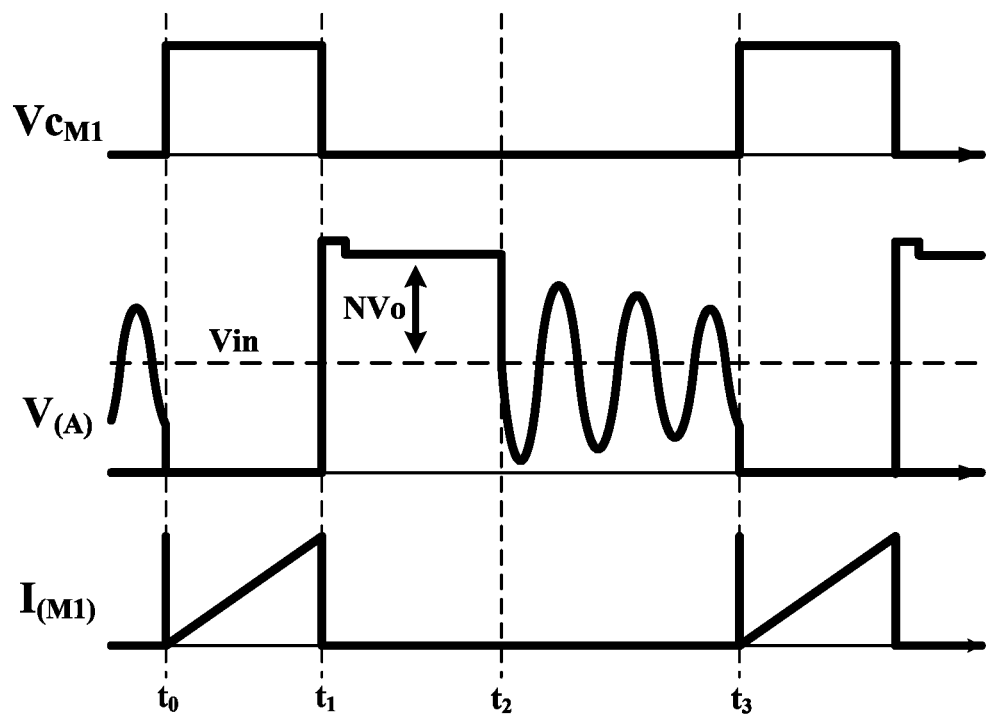
FIG. 6B presents the key waveforms of the circuit from FIG. 6A.

The key waveforms of the flyback topology presented in FIG. 6A, are depicted in FIG. 6B.

In between t0 to t1 the primary switch M1, 210 is turned on and the current builds up through the primary winding storing energy in the magnetizing inductance of the transformer Tr1, 1200.

At t1 the primary switch M1, turns off and the magnetizing current will reflect from the primary winding to the secondary winding via switch SR1.

At t2 the current through the secondary winding reaches zero, which means that the energy stored in the transformer Tr1, 1200 during t0 to t1 was fully delivered to the secondary between t1 to t2.

The time interval between t2 to t3, wherein primary and secondary switchers are off is the dead time. During this period parasitic oscillations do occur in the switching node, A, 280. These parasitic oscillations are caused by the resonant circuit formed by the primary winding, 1210 and the parasitic capacitance reflected across M1, Cp, 300, and energized by the $Wp_{Flyback}$, depicted in FIG. 6C, wherein N is the turn ratio between primary and secondary.

In the topology the first switch of the circuit from FIG. 1A is M1, 210 and the second switch (Sn, 130) is SR1. As previously mentioned, the parasitic oscillation will start after the secondary switch turns off, in this topology after SR1, 1040, turns off.

Figure 7A:
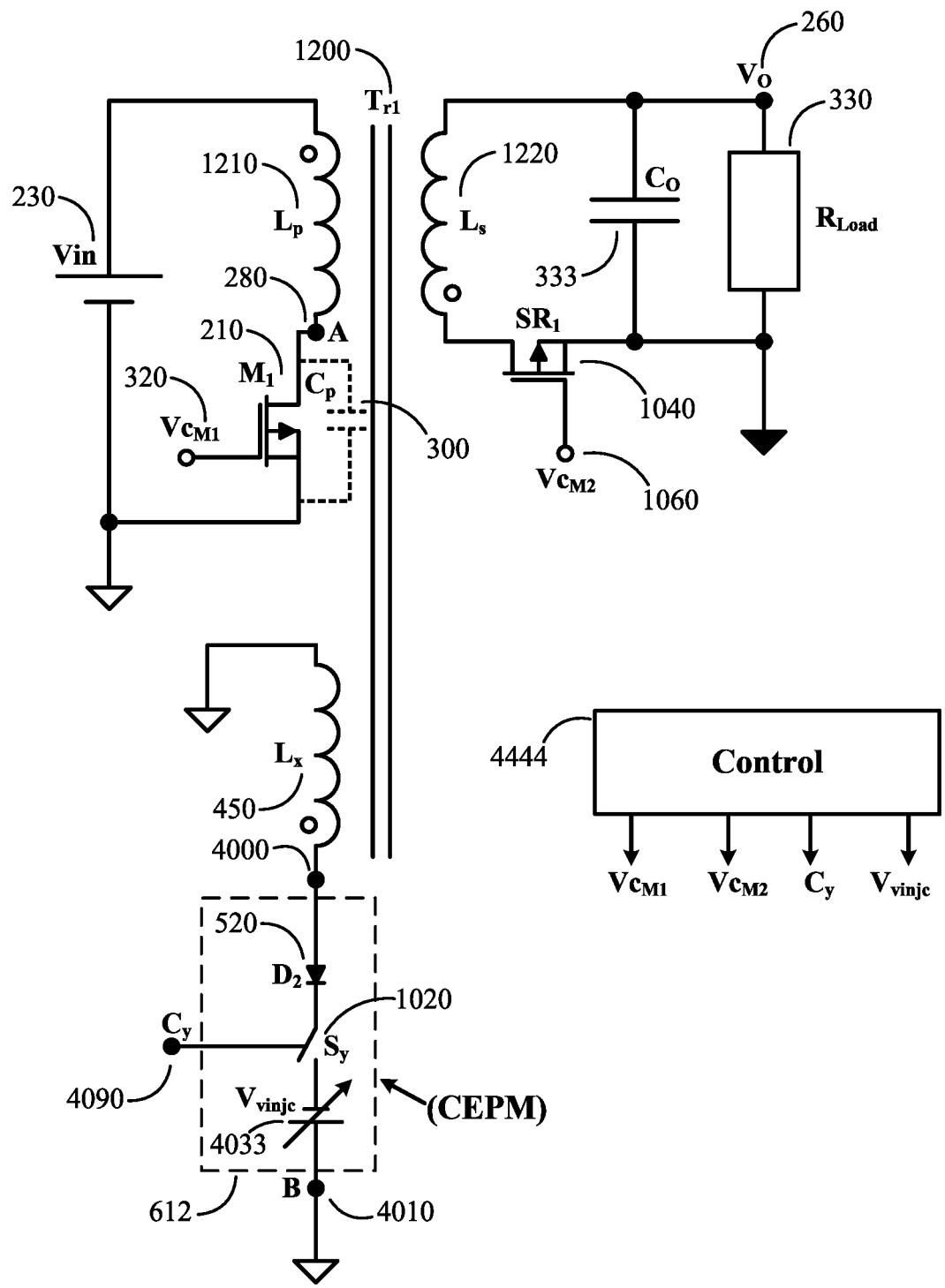
FIG. 7A presents the flyback topology using the intelligent clamp circuit placed on an auxiliary winding.

In FIG. 7A is presented a flyback topology wherein CEPM module is added across an auxiliary winding Lx, 450. The CEPM can be also be placed across the primary winding Lp, 1210, though in this case a floating drive for Sy, 1020 of CEPM will be necessary. The module is the CEPM, 612. It is formed by the switch Sy, 1020, diode D2, 520 and the controlled voltage source CEPM. The role of this module is to extract the electrical energy contained in the parasitic capacitor of Cp, 300, and convert it in the magnetizing current in the Tr1, 1200 and in addition to that inject a controlled energy in magnetizing current of Tr1, 1200 by the controlled voltage source Vvinjc of CEPM. There is a controller, 4444, which controls M1, M2, the switch Sy, 1020 via Cy, 4090, and control of Vvinjc.

Figure 7B:
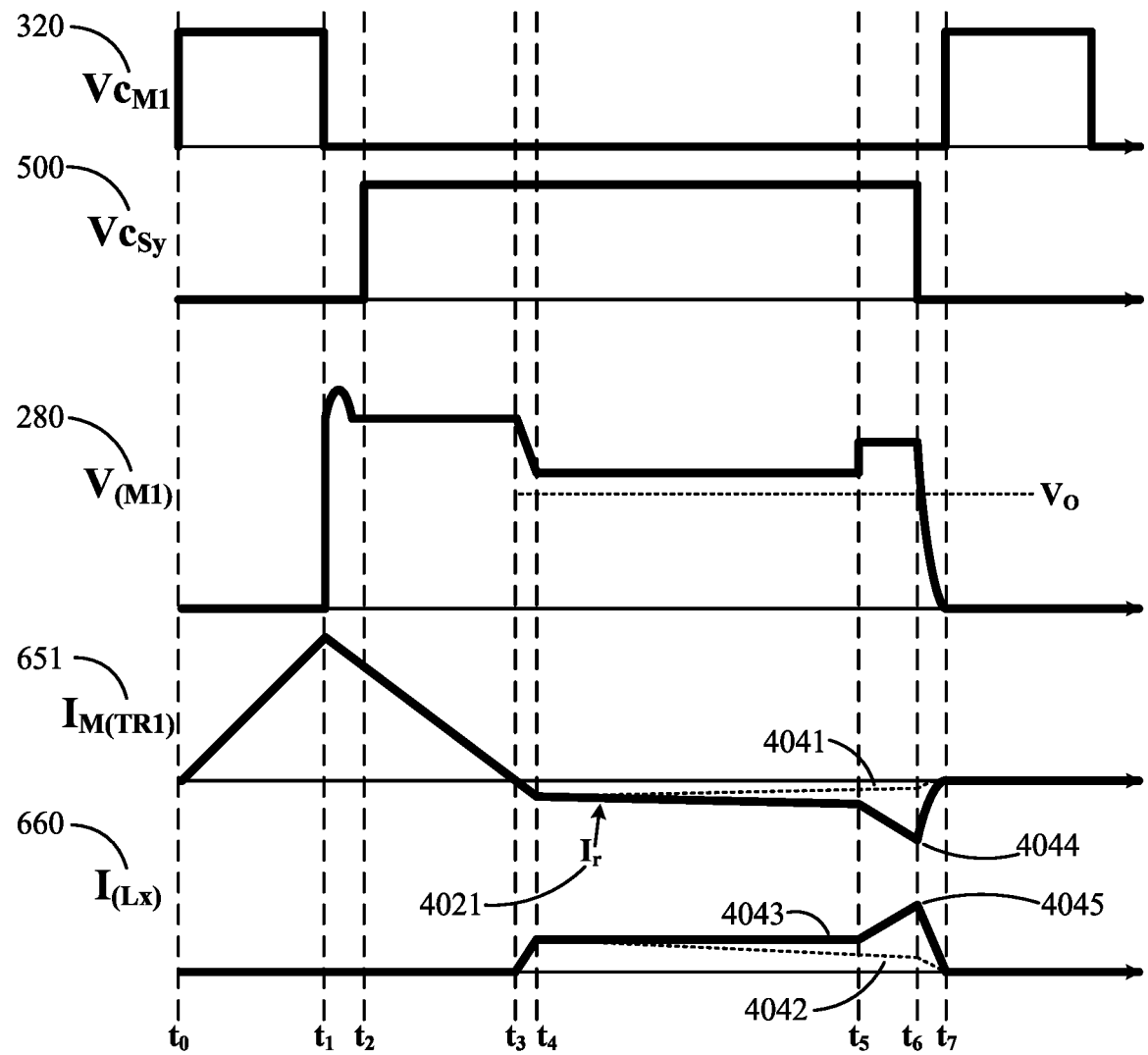
FIG. 7B presents the key waveforms of the circuit from FIG. 7A.

In FIG. 7B are depicted the key waveforms for the circuit from FIG. 7A wherein only CEPM module is used. In this topology the first switch is M1, and the second switch is SR1, 1040. The control for the Sy is complementary signal of the first switch and that is depicted in FIG. 7B. There is a dead time between the first switch, controlled by VcM1 and the control signal for the Sy, which is Vcsy, as depicted in FIG. 7B which is the time between t1 to t2 and the time in between t6 to t7.

The waveforms which are presented in FIG. 7B are: the control signal for M1, $Vc_{M1}$, the control signal for the Sy, 4090, which is Vcsy,500, the voltage across M1, V(M1), 280, the magnetizing current through TR1, 1200, and the current through the auxiliary winding Lx, 450.

In between t0 to t1 the main switch M1 is turned on and the magnetizing current builds up to a peak level at t1. After t1 turns off the magnetizing current starts flowing in the secondary winding and starts decaying towards zero, reaching zero amplitude at t3. In between t1 to t3 all the energy stored in the magnetizing current of Tr1, is delivered to the output load formed by Co, 333 and the output load, $R_{Load}$, 330.

At t3, the energy stored in the parasitic capacitance Cp, 300 reflected across M1 the energy is $W_{pFlyback}$, defined in FIG. 6C.

In between t3 to t4 the energy stored in Cp, 300 is converted from electrical energy to magnetic energy, stored in the magnetizing current Ir, 4021 from FIG. 7B. The magnetizing current IM(Tr1) is flowing in the winding Lx, via the diode D2, 520, Sy, 1020 and Vvinjc, 4033. In case Vvinjc has zero voltage, the amplitude of the Ir current will decrease in time, as depicted by 4041, in FIG. 7B, due to the conduction losses in D2 and Sy, 4020. In some applications the role of the voltage injection Vvinjc, 4033, in between t4 to t5 is to compensate for the amplitude loss of the current Ir. One of the embodiments of this specification is to increase the value of Vvinjc between t5 to t6. Some solutions are depicted in FIG. 3D, FIG. 3E and FIG. 3F. By increasing the amplitude of Vinj c, the amplitude of Ir should increase in such a way that after t6 when the Sy, 4020 turns off the necessary energy in IM(TR1) is available to discharge the parasitic capacitance Cp, 300 to zero before the main switch M1, 210 turns on at t7. Through different means analog or digital means the Vvinjc can be modulated in a way that the amplitude if Ir at t6 is satisfactory to discharge Cp, 300 to zero or to a given voltage level. These features are available in the Controlled Energy Preservation Module (CEPM). By controlling the value of the time interval between t5 to t6 and by controlling the amplitude of Vinjc during this interval the peak negative magnetizing current of Tr1 can be controlled in order to discharge the Cp, 300, to a desired voltage level, in between t6 to t7. In most of the applications the desired level is zero voltage, or a small voltage level in between t4 to t5 to achieve maximum efficiency of the power converter using the Flyback topology incorporating the CEPM module.

Figure 8A:
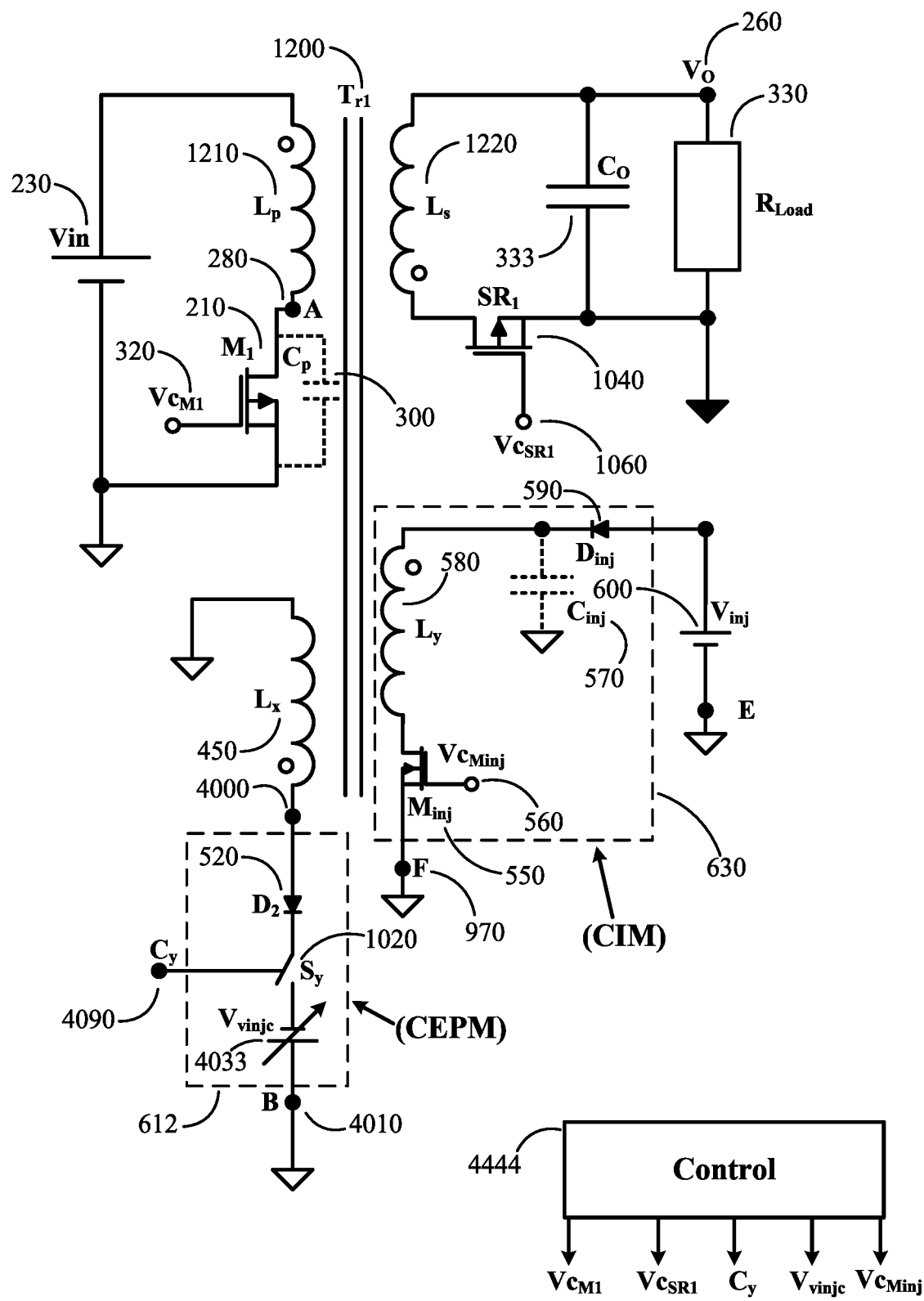
FIG. 8A presents the flyback topology using the intelligent clamp circuit and current injection module placed on auxiliary windings.
Figure 8B:
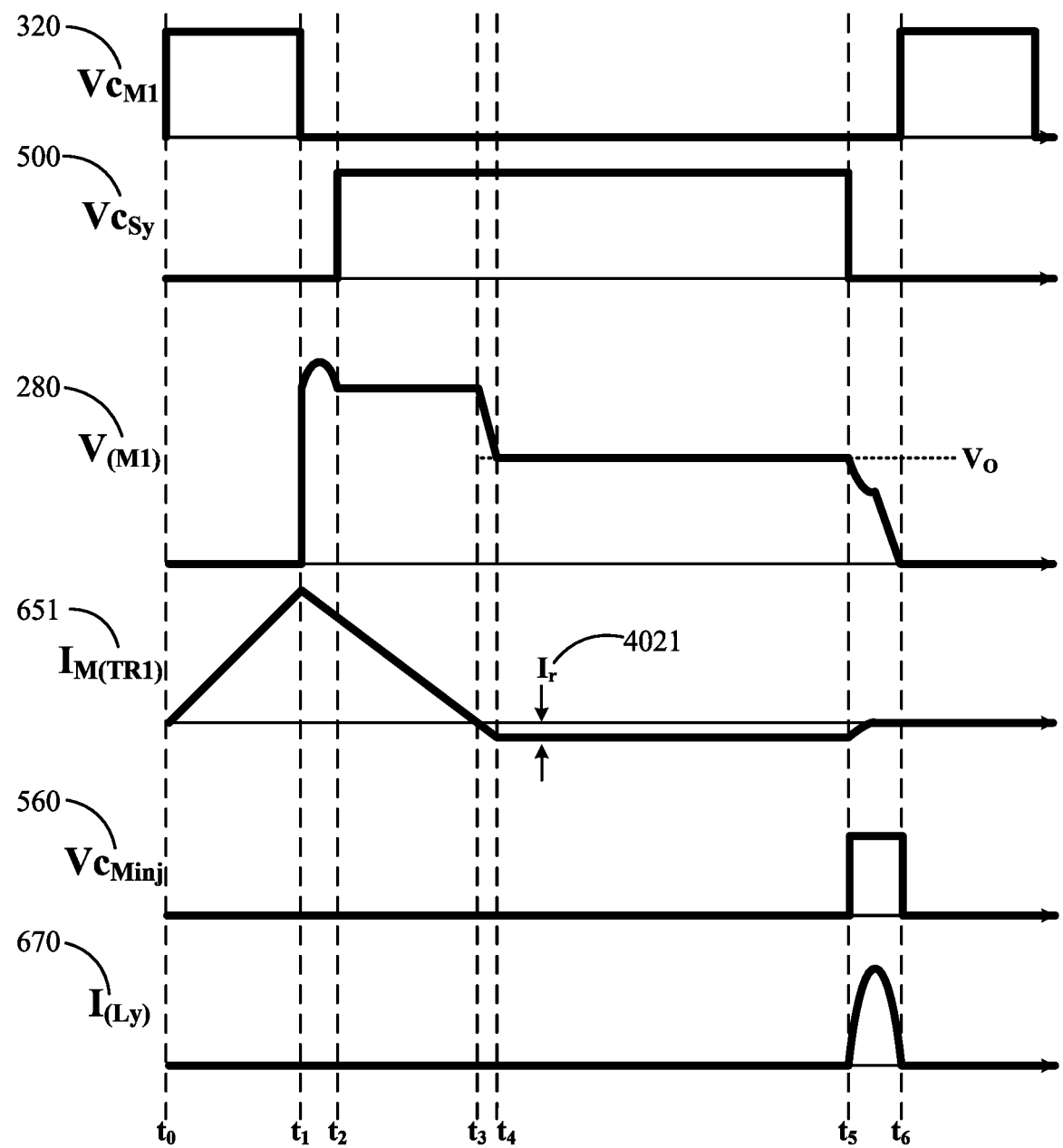
FIG. 8B presents the key waveforms of the circuit from FIG. 8A.

In FIG. 8A is presented a flyback topology circuit wherein two auxiliary windings, Lx, 450 and Ly, 580 are coupled together with Lp, 1210 and Ls, 1220. The Current Injection Module, CIM, is added to the Flyback circuit together with the CEPM module. For the application wherein Vvinjc is not modulated zero voltage switching is accomplish by using CIM, 630. In FIG. 8B are presented the key waveforms, VcM1, VcSy, V(M1), IM(Tr1), VcMinj, and the I(Ly).

Between t0 to t4 the mode of operation is exactly as the implementation from FIG. 8B which waveforms are depicted in FIG. 7B. In between t4 to t5, the magnetizing current Ir, 4021, represents the energy of the parasitic capacitance Cp, 300 converted in magnetizing current, Ir, between t3 to t4. The energy contained in the magnetizing current Irr, may not be enough to discharge the parasitic capacitor Cp, 300 to zero after t5 and before t6. In order to obtain zero voltage switching conditions for M1 at t6, when M1 is turned on, at t5 the current injection circuit is activated, and a pulse of current will start flowing through the current injection winding, Ly, 580, current which will reflect into the primary winding Lp, 1210, and discharge the parasitic capacitance Cp, 300 towards zero prior t6 in such way that when the switch M1, 210 turns on at zero voltage switching conditions. The discharge of the parasitic capacitance Cp, 300, is done by the negative magnetizing current Ir, and by the current injection reflected into the primary winding and originated in the Ly winding. The current injection switch can be activated after the voltage across the main switch is decayed to a certain level by the magnetizing current in order to optimize the discharge of the parasitic capacitance Cp, 300 to zero. The Vvinjc can be zero or a low amplitude in order to decrease the conduction power dissipation caused by Irr during the dead time. By using both modules, CEPM and CIM can create a flyback topology without parasitic oscillations during the dead time, Flyback topology which can operate at constant frequency. The Vinj, 600 can be fully or partially energized by other parasitic energies such as leakage inductance. This solution eliminates the need for valley detection and allows an operation at higher frequency without jumping from a valley to another valley which leads to challenges in control.

This solution has many advantages. For example, for large dead time, the magnetizing current is decayed, and the current injection will always guarantee zero voltage switching.

Another advantage is the capability to operate a constant frequency or change the frequency of operation at as needed for the optimization of the system wherein this power converters is powering. The self-adjusting feature of the Rompower current injection in the CIM wherein the amplitude of current injection is decreasing when the voltage across the main switch is decreasing, these two modules operate very efficiently together obtaining the best power conversion efficiencies by comparison with other solutions.

Figure 9A:
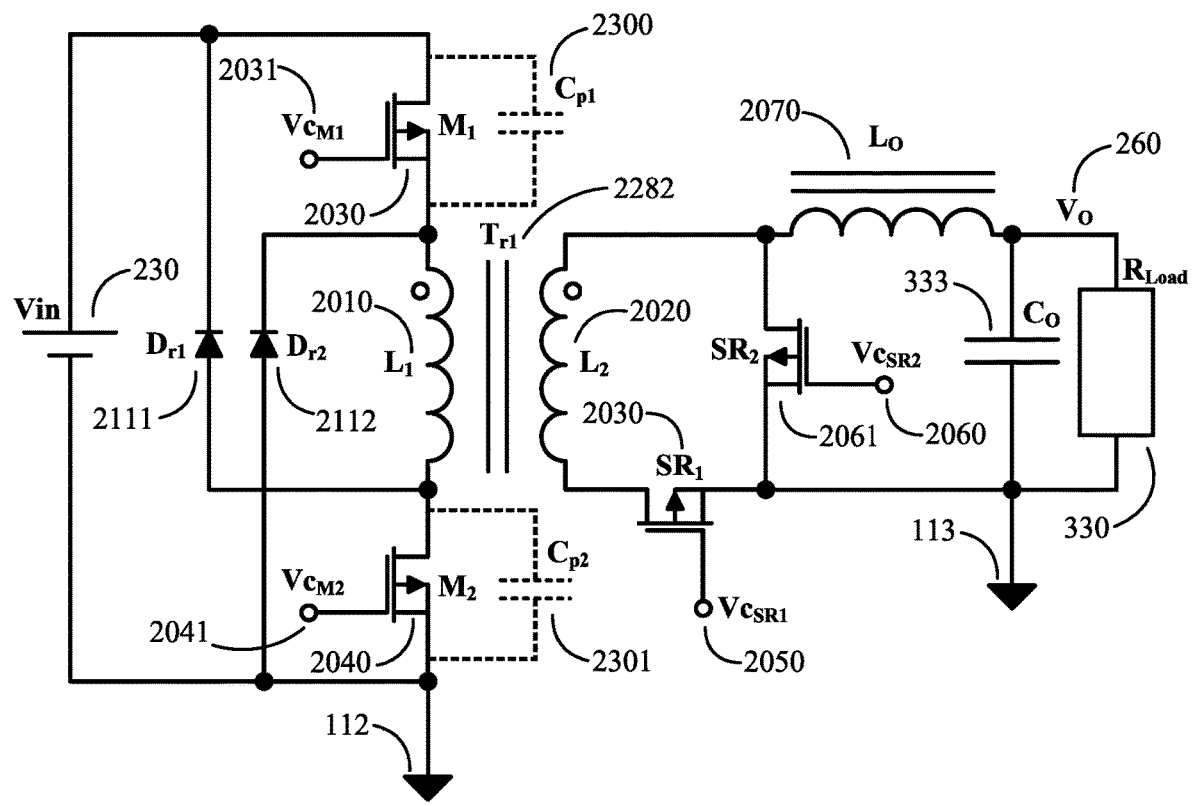
FIG. 9A presents the two transistors forward topology.

Another isolated topology wherein parasitic oscillations do occur is the Two Transistor Forward Topology. In FIG. 9A is depicted the basic circuit of a two-transistor forward topology.

The Two Transistor Forward Topology presented in FIG. 9A is composed by two primary switching devices in the primary, M1, 2030 and M2, 2040, controlled by two control signals VcM1, 2031 and VcM2, 2041. A transformer Tr1, 2282 having a primary winding L1, 2010 and a secondary winding L2, 2020, wherein the primary winding L1, 2010 is connected to said primary switching devices, is also part of the circuit. Dr1, 2111 and Dr2, 2112 are the reset diodes and are placed across the primary winding. In the secondary there are two synchronous rectifiers, SR1, 2030 and SR2, 2061, an output inductor, Lo, 2070 connected to the output load circuit, composed by an output capacitor Co, 333 and a $R_{Load}$, 300.

Figure 9B:
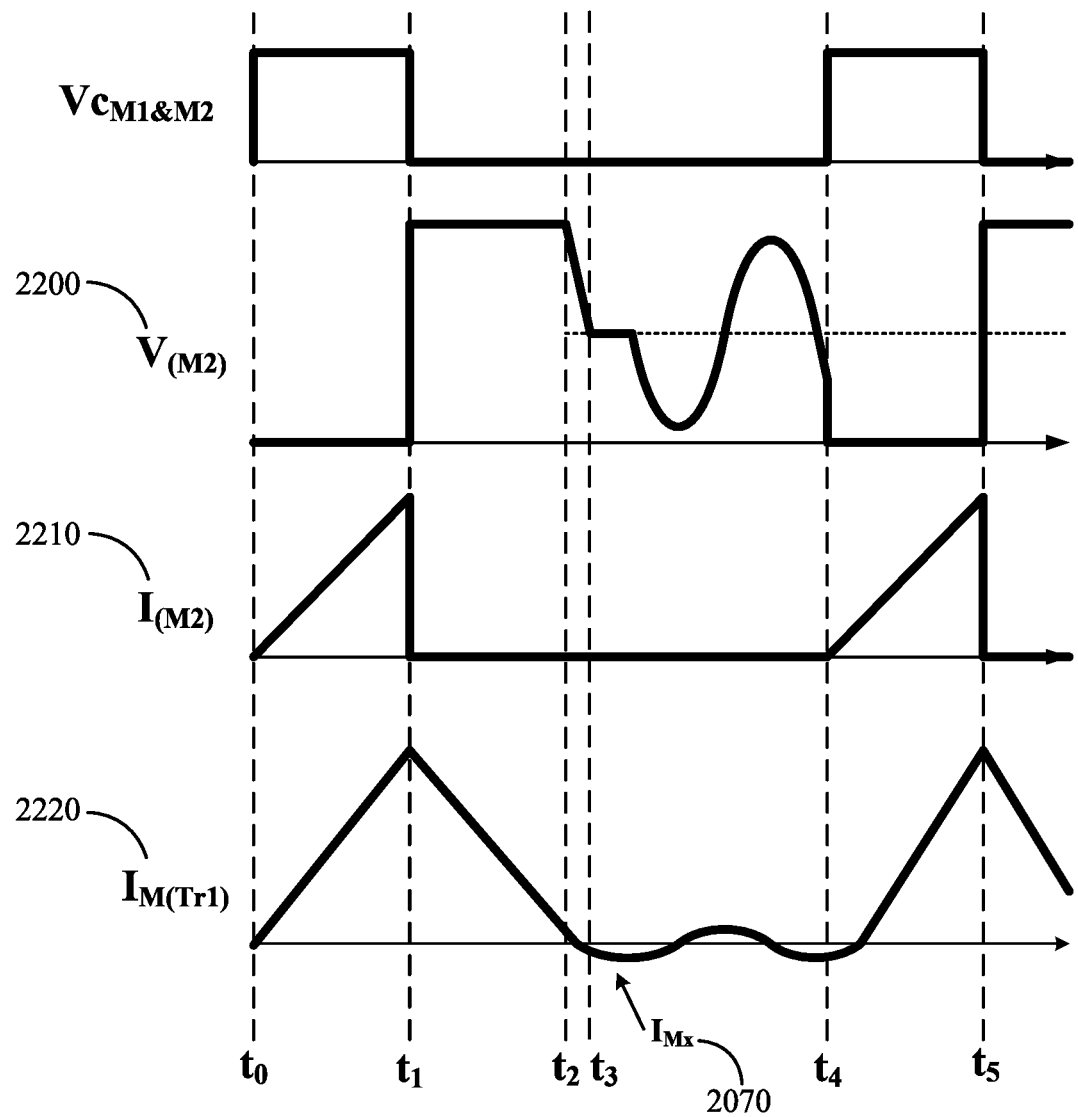
FIG. 9B depicts the key waveforms of the circuit from FIG. 9A.

In FIG. 9B are presented the key waveforms of the topology presented in FIG. 9A. The key waveforms presented in FIG. 9B are: VcM1 & VcM2, the voltage across M2, V(M2), 2200, the current through the primary switching element, I(M2), 2210 and the magnetizing current through TR1, IM(Tr1).

Between t0 to t1 the primary switchers M1, 2030 and M2, 2040 are on and current starts flowing through said switchers and the primary winding of the transformer, L1, 2010. In the secondary the current flows through SR1, 2030, and Lo, 2070 towards the output load formed by Co, 333 and $R_{Load}$, 330. During this time period the magnetizing current also builds up as depicted by IM(Tr1), via the current through the primary winding L1, 2010, which represents the summation of the current reflected from the secondary and the magnetizing current.

Between t1 to t2 the magnetizing current will open diodes Dr1 and Dr2 and during this time the reset of the transformer Tr1, 2282 will occur.

At t2 the parasitic capacitances reflected across M1 and M2, have stored an energy which is presented in FIG. 9C1.

Figure 2A:
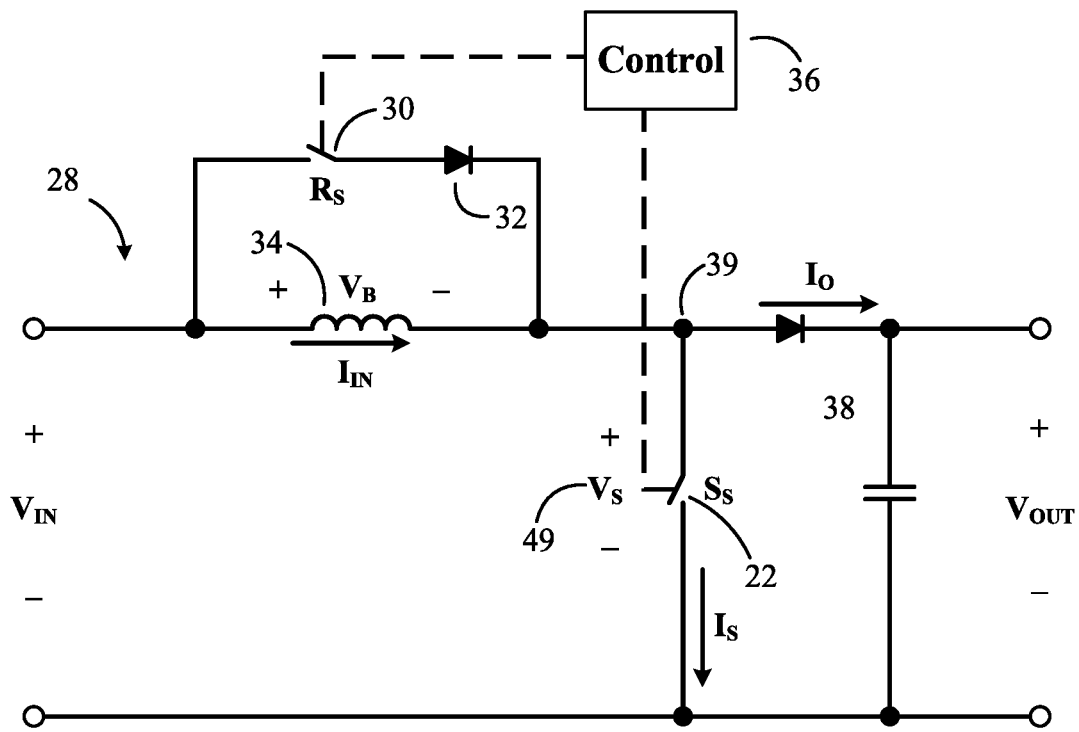
FIG. 2A depicts a prior art circuit.
Figure 2B:
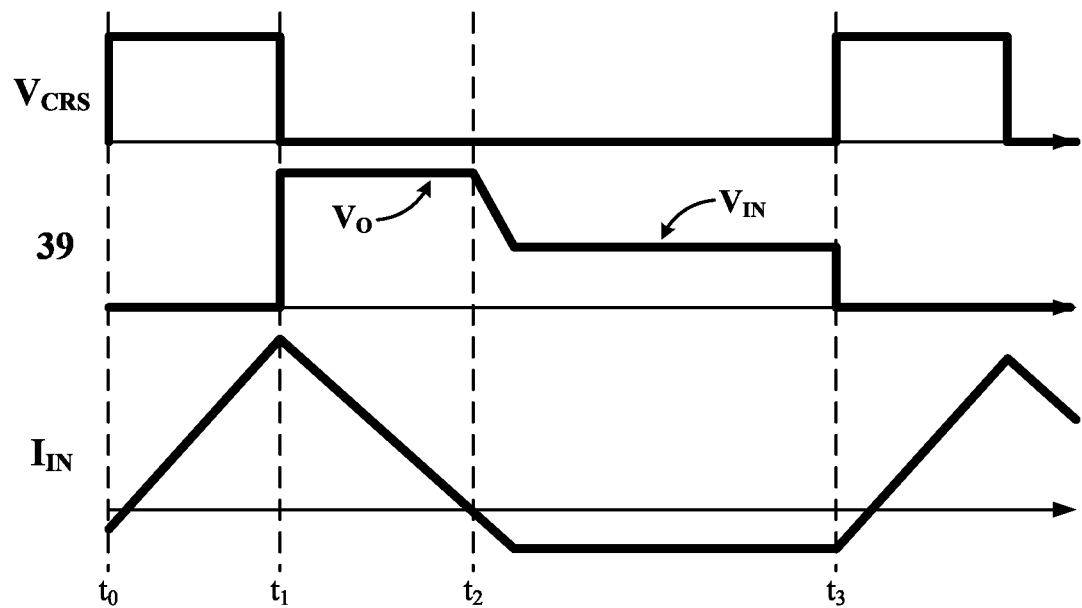
FIG. 2B depicts the key waveforms of the circuit depicted in FIG. 2A.

In Between t2 to t3, the energy stored in the parasitic capacitances Cp1 and Cp2 will convert in magnetic energy via the magnetizing current IMx, 2070 whose formula is presented in FIG. 9C2.

In between t3 to t4, also named the dead time period wherein parasitic oscillation do occur, oscillation created by the resonant circuit formed by the inductance of the primary winding and the parasitic capacitances reflected across the switching elements, Cp1 and Cp2. This resonant circuit is energized by the electrical energy defined by the formula Wp-TT forward presented in FIG. 9C1. The electrical energy defined in FIG. 9C1 is converted in magnetic energy during the time interval t2 to t3, magnetic energy stored in the transformer Tr1, 2282, by the magnetizing current IMx, 2070 defined in FIG. 9C2.

Figure 10A:
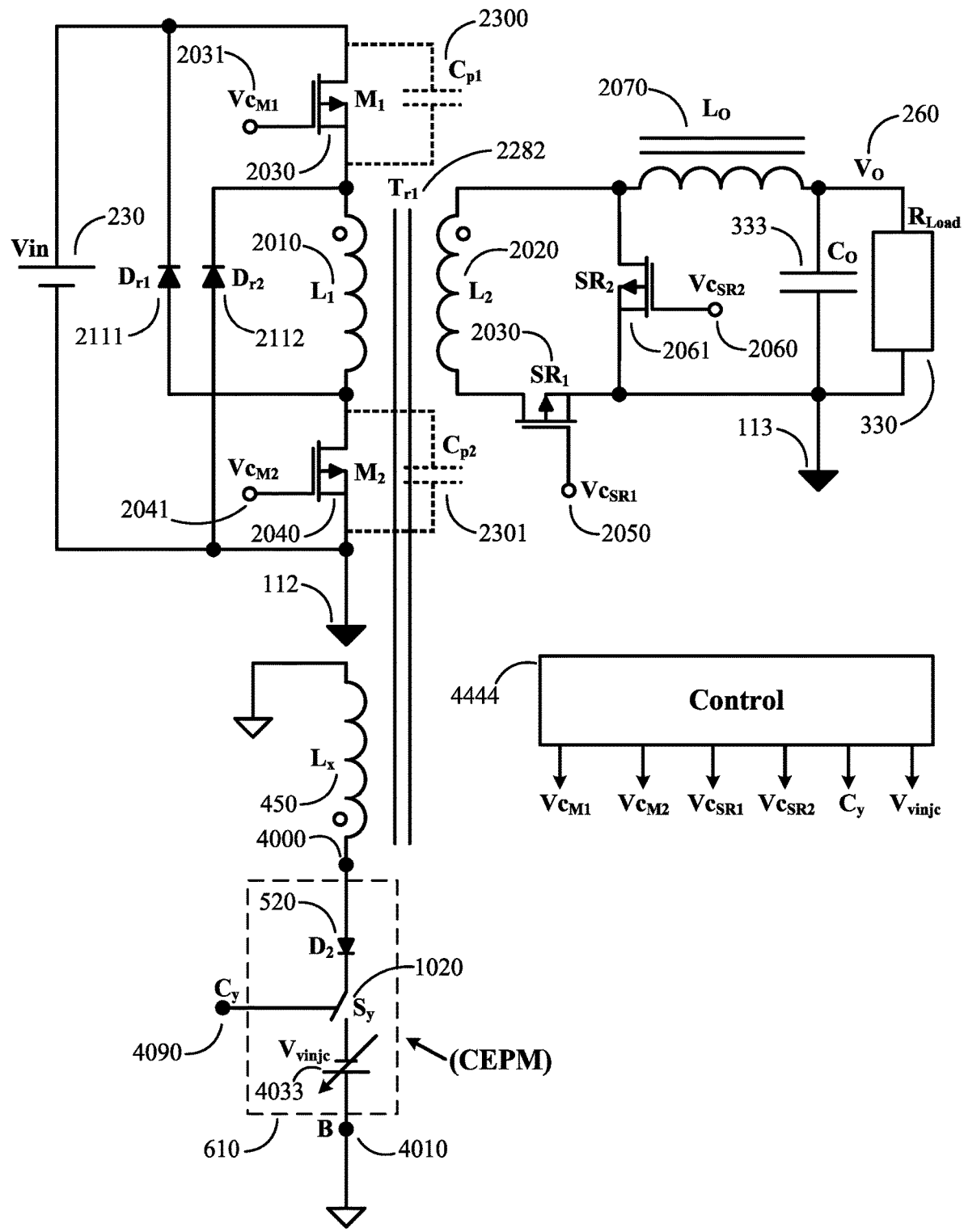
FIG. 10A presents the two transistors forward topology using the intelligent clamp circuit.

In FIG. 10A is presented the two-transistor forward circuit from FIG. 9A wherein the module, CEPM is placed across an auxiliary winding Lx, 450.

Figure 10B:
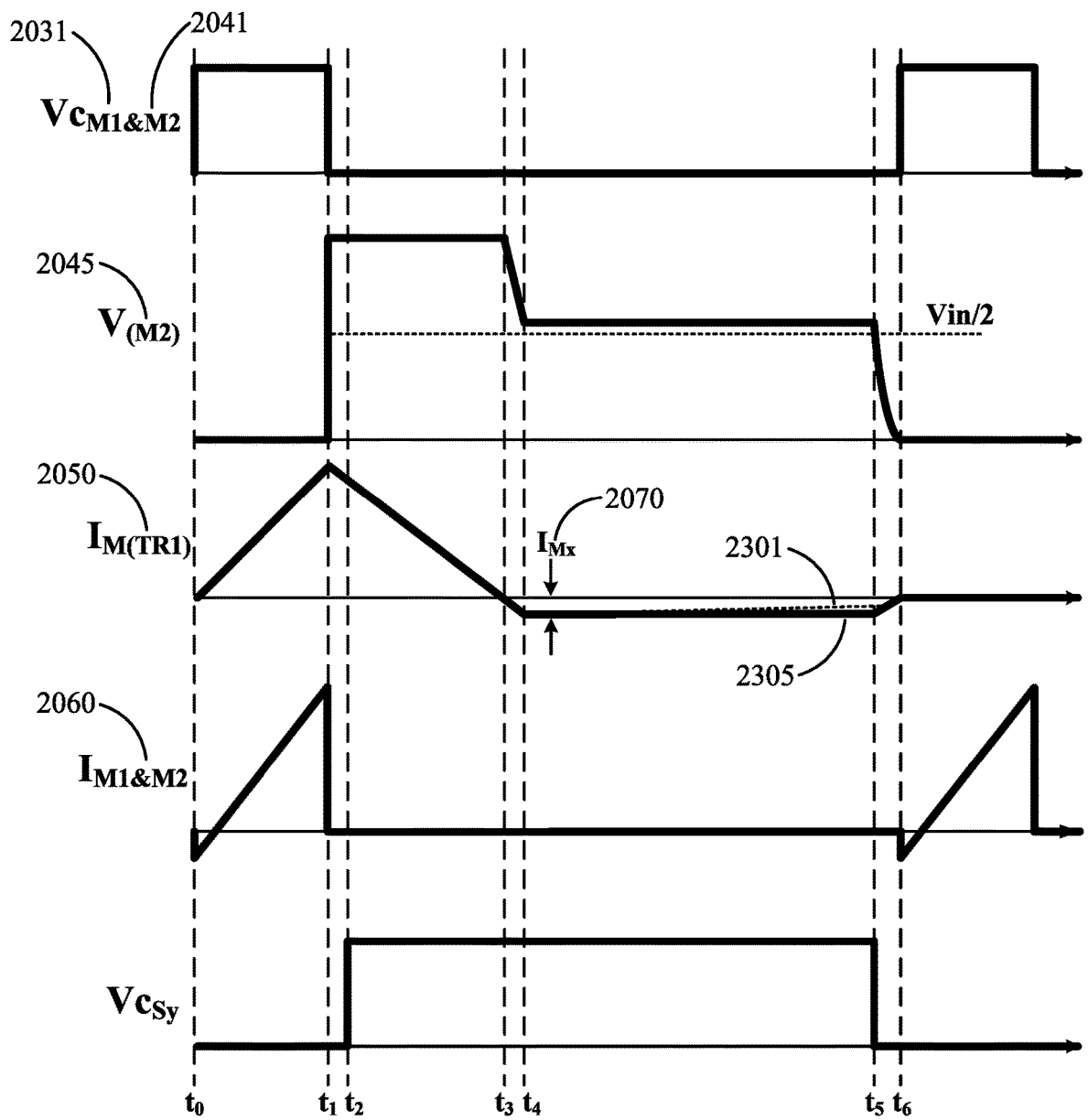
FIG. 10B presents the key waveforms of the circuit from FIG. 10A.

In FIG. 10B are depicted the key waveforms of the circuit presented in FIG. 10A.

In between t0 to t1 both switchers M1,2030 and M2, 2040, are turned on and during this time the magnetizing current will build up reaching its peak at t1.

In this topology the primary switchers M1 and M2 form the first switch. The diodes Dr1 and Dr2 form the second switch. The parasitic oscillation start after the second switch (Dr1&Dr2) turn off as depicted in FIG. 9B. The switch Sy 1020 which is part of the CEPM is complementary to the first switch with a small dead time in between, dead time, created by the time interval between t1 to t2 and t5 to t6. This switch is also called the "shorting switch". The small dead time is called primary switch-shorting switch dead time. This is to differentiate it from the dead time in between the falling edge of the second switch and the rising edge of the primary switch, dead time wherein the parasitic oscillations do occur. In FIG. 10B the on time for the second switch is the time interval between t1 to t3 when the current through primary winding, L1, 2010, reaches zero.

At t2, the switch Sy, 1020 of the CEPM is turned on.

In between t1 to t3 the magnetizing current decreases to reach zero at t3. The time interval t1 to t3 is referred to as the reset time of the transformer Tr, 2282. The energy stored in the leakage inductance in between the primary winding L1, 2010, and secondary winding, 2020, is transferred back to the input voltage source Vin, 230, after t1 when the switchers M1 and M2 are turned off.

At t3, the parasitic capacitances reflected across M1 and M2, have an energy Wp-TT forward, whose formula is presented in FIG. 9C1. In between t3 to t4, electrical energy stored in the parasitic capacitances C1 and C2 is converted into magnetic energy via the magnetizing current IMx, 2070.

At t4 the magnetizing current IM(TR1) reaches a negative amplitude IMx, 2070. In between t4 to t5 the magnetizing current IMx which flows via D2, 520, Sy, 4020, and Vvinjc, 4033, starts decaying due to the conduction losses as depicted by 2301 in the event wherein the Vinjc does not have the necessary voltage level to keep its amplitude constant. The necessary voltage level for Vinjc is the voltage level which maintains a constant amplitude as depicted by 2305.

The voltage injection Vvinjc, 4033, can be tailored to achieve certain goals for IMx. One goal is to maintain the necessary voltage level as previously mentions to maintain the amplitude of the IMx, constant as depicted by 2305, in FIG. 10B. In such case, after t5 when Sy, 1020 turns off at t5 the negative magnetizing current IMx, 2070, will discharge the parasitic capacitances Cp1 and Cp2 to the voltage levels of the first valley of the parasitic ringing. Other goal is to increase the magnetizing current IMx to an amplitude such as at t5 the magnetizing current shall have the necessary amplitude to fully discharge the parasitic capacitances Cp1, 2300 and Cp2, 2301 in such way that the switchers M1, 2030 and M2, 2040 shall turn on at t6 at zero voltage switching condition.

Figure 10C:
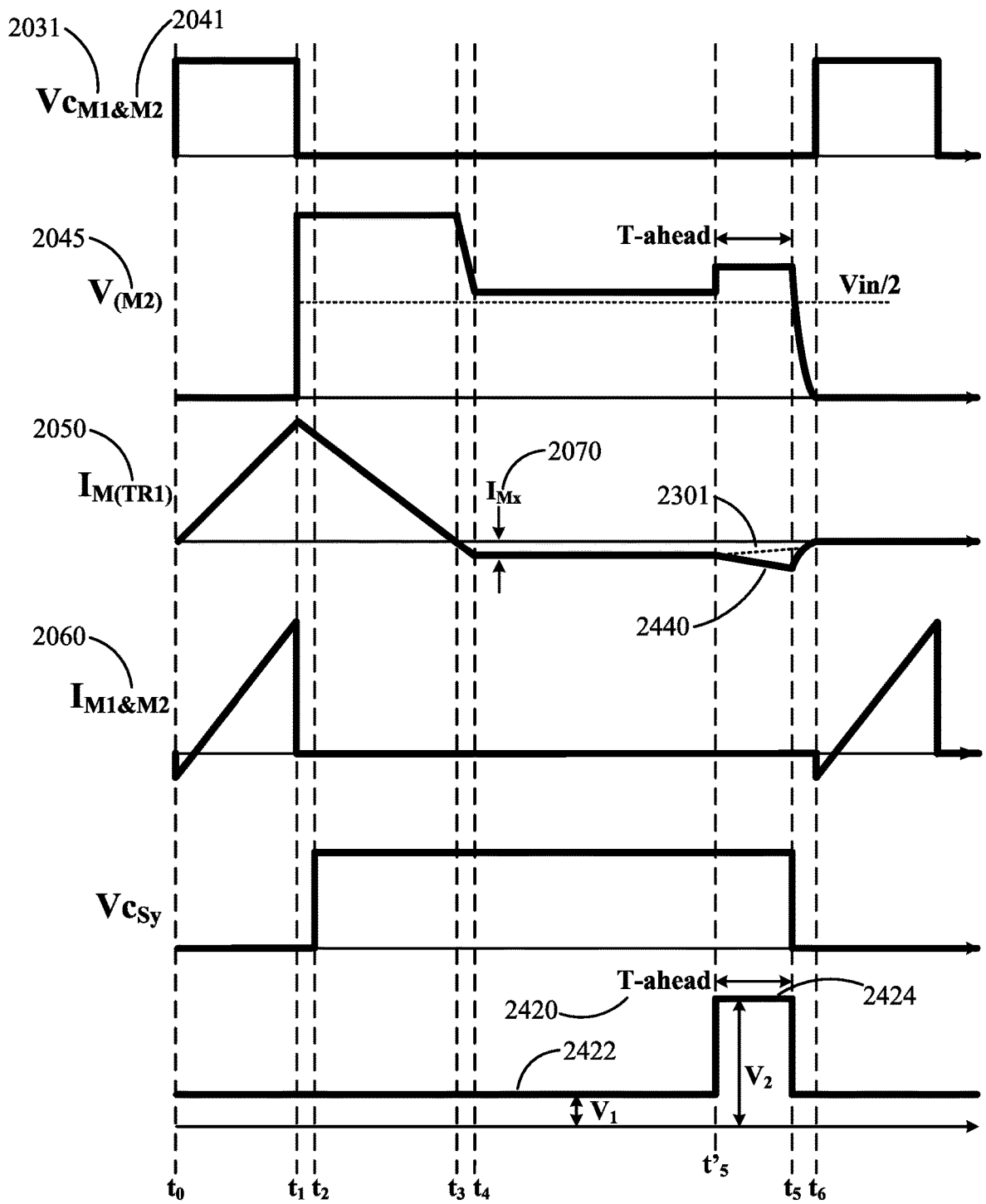
FIG. 10C depicts the key waveforms of the circuit from FIG. 10A wherein the intelligent clamp circuit is programed for ZVS.

In one of the preferred embodiments of this specification, the voltage injection source Vvinjc, 4033, shall have an increased amplitude for a time period prior to t5. This method has the advantage that it decreases the conduction losses by the IMx during the dead time, when IMx has a lower amplitude and its amplitude is adjuated for a short time interval between t5' to t5. This concept is depicted in FIG. 10C. Using intelligent control, the increase magnitude of Vvinjc shall occur at a given time prior t5, named "T-ahead", 2420. This method is the preferred solution for maximum efficiency. The value of "T-ahead" and the V2 amplitude between t5' to t5, will control the amplitude of IMx at the t5 as depicted by IM(TR1), 2440.

For example, in FIG. 10C the Vvinjc can be low amplitude, V1, 2422, from t4 until t5' and at t5' Vvinjc shall increase to V2, 2424, amplitude. The "T-ahead" can be the result of a look up table in the intelligent control. The delay in between t1 to t5', after which Vvinjc swings from V1 to V2, can be predicted in order for the magnetizing current IMx to have the necessary amplitude at t5. The "T-ahead" can be easily modulated digitally for a given V2, in order to achieve the desired amplitude for the magnetizing current IM(Tr1) at t5.

This preferred embodiment is depicted in FIG. 10C wherein the amplitude of Vvinjc can be small, V1, 2422, until t5'. At t5' the amplitude increases from V1, 2410 to V2, 2430, which can be implemented by using a switch as presented in FIGS. 3D and 3F. In case V2 has a determined voltage and the control of the negative magnetizing current 2440 is done by tailoring the value of T-ahead.

This embodiment can apply to any topology wherein CEPM module is utilized, such as boost, buck, flyback, half bridge and half bridge derivative, full bridge and full bridge derivative and so on.

Figure 11A:
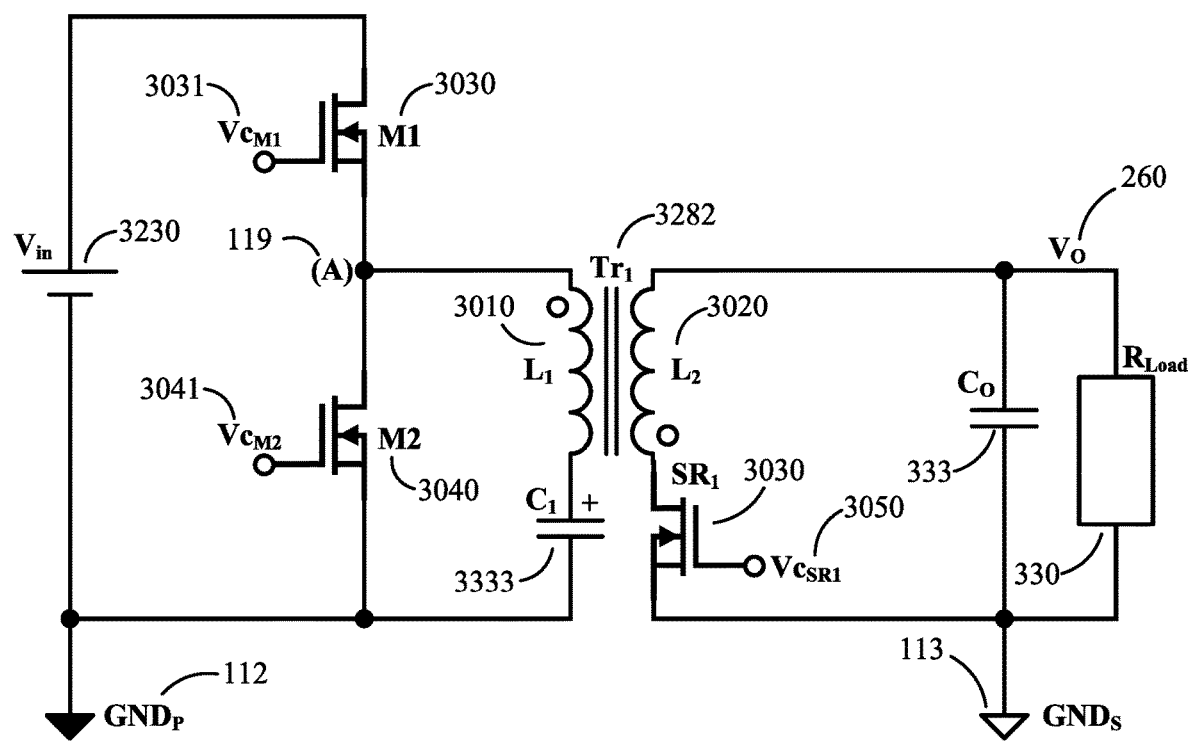
FIG. 11A is presented the flyback derived, single ended asymmetrical half bridge.

FIG. 11A illustrates a simplified schematic of electronic circuitry of a power converter utilizing the flyback derived, single ended asymmetrical half bridge topology, which is a half bridge derivative, wherein the embodiments of this specification can be applied. It is composed by a totem pole switchers, M1,3030, and M2,3040, and a transformer Tr1, 3282, which contains a primary winding L1, 3010 and a secondary winding, L2 3020 wherein the first termination of the primary winding is connected to the common connection between M1 and M2, referred in this specification as switching node A, 119 and the second termination of the primary winding is connected to the resonant capacitor C1, 3333. The drain of M1, 101 is connected to the input voltage source, Vin, 3230 and the source of M2, 112 and the termination of C1, 3333 not connected to the primary winding are connected to the negative polarity of the input voltage source Vin, 112.

Figure 11B:
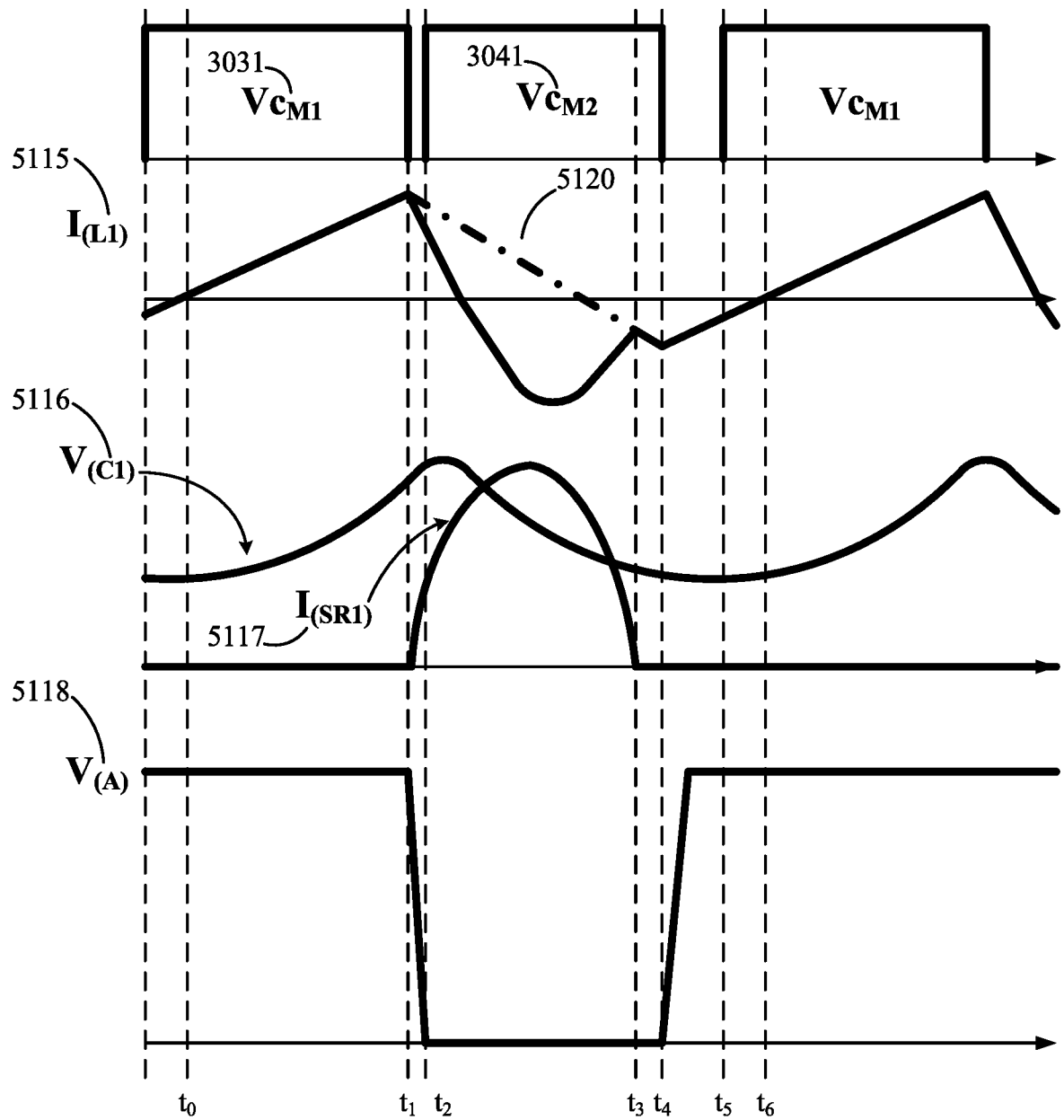
FIG. 11B presents the key waveforms of the circuit from FIG. 11A.

The mode of operation of the single ended asymmetrical half bridge is depicted in FIG. 11B. In FIG. 11B are depicted the key waveforms such as VcM1, 3031 and VcM2, 3041 which represent the control signal for M1, 3030, and M2, 3040. In FIG. 11B is further presented the current through L1, 5115 and the magnetizing current, 5120. Further in FIG. 11B is presented also the voltage across the resonant capacitor C1, V(C1), 5116 and the current through the secondary synchronous rectifier SRL I(SR1), 5117. Further in FIG. 11B is depicted also the voltage in the switching node, A, V(A), 5118.

The waveforms depicted in FIG. 11B apply for the operation in continuous mode. We define the continuous mode operation as the operation wherein the Vc1M1 and Vc2M2 are successive to each other with a given dead time in between and without blanking phases. In discontinuous mode of operation there is an extended dead time following the on time of M2, 102, when no energy is processed, said extended dead time which is several times larger than the said dead time between VcM1, 3031, and VcM2, 3041 in continuous mode of operation.

At lower output power the mode of operation is in discontinuous mode. In this mode the on time for M1 switch is followed by an on time of M2 switch and followed by an extended dead time. In addition to the modulation of on time of the M1 switch the extended dead time can be also modulated to decrease the power taken form the input. This mode of operation is depicted in FIG. 11C.

The mode of operation at very light load is by using a train of pulses, which are a succession of on time for M1 switch followed by on time for M2 switch, operation as described in continuous mode, followed by a control period of the extended dead time.

Figure 11C:
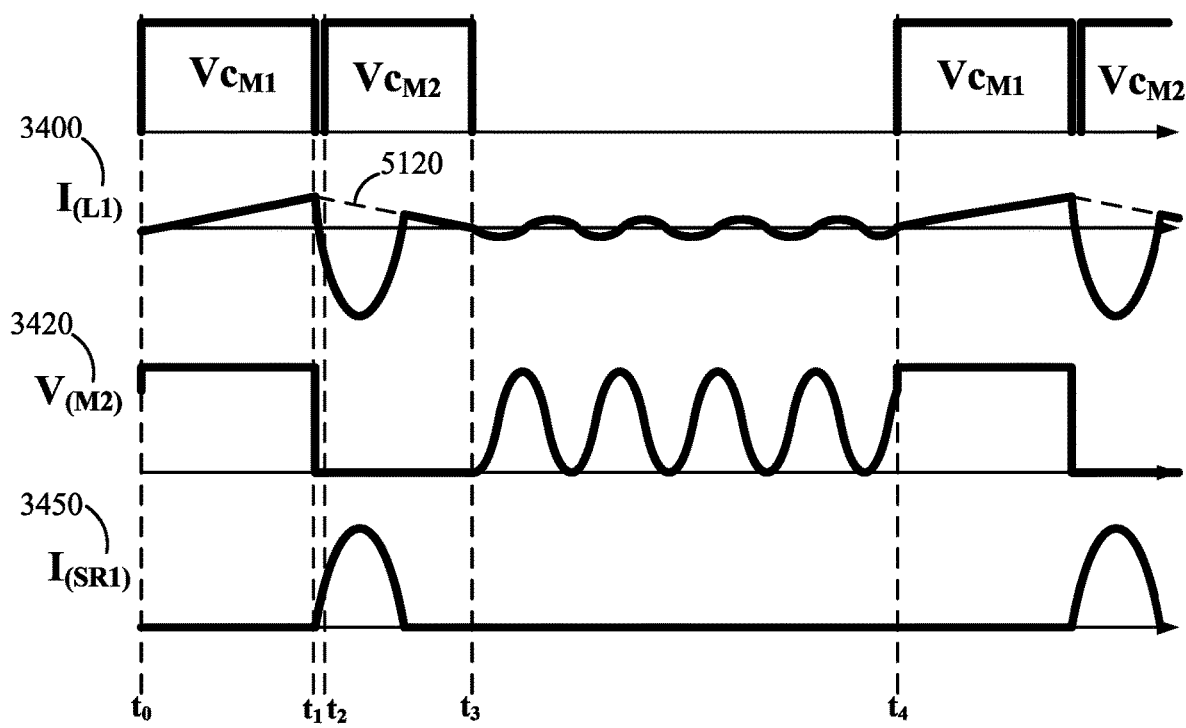
FIG. 11C is presented the flyback derived, single ended asymmetrical half bridge operating in discontinuous mode.

Like the flyback topology operating in discontinuous mode during the extended dead time there is an oscillation caused by the resonance in between the primary inductance L1, 3010, and the parasitic capacitance reflected in the switching node A, 119 as depicted in FIG. 11C.

In this topology M1 is the first switch and M2 is the second switch and the inductive element depicted in FIG. 11A is the primary winding L1, 3010 of the transformer Tr1, 3282.

As depicted in FIG. 11B between t0 to t1 the upper switch M1, 3030 is turned on and the current through the transformer primary winding, L1, 3010 is building up until it reaches a determined peak level.

At t1 the upper switch M1, 3030, turns off and the magnetizing current in the transformer Tr1, 3282 forces the conduction through the body diode of M2, 3040. The interval t1 to t2 by design is made to be relatively short to minimize the dissipation through the body diode.

At t2 the lower switch M2, 3040 is turned on and the magnetizing current continues to flow through M2, L1 and resonant capacitor C1, 3333. The magnetizing current is depicted in a dotted line, 5120. In addition to the flow of the magnetizing current there is another quasi-resonant current which is the result of the resonance in between the resonant capacitor C1,3333 and the leakage inductance between L1, 3010 and L2, 3020, of the transformer Tr1, 3282. The current reflected in the secondary has a half sinusoidal shape. The half sinusoidal shape of the secondary current, reflected in the primary via L1, 3010 is added to the magnetizing current flowing in the primary winding as depicted by I(L1), 5115 from FIG. 11B.

At t3 the current in the secondary through SR1, 3030 reaches zero and turns off the SR1. The SR1 can be replaced by a diode function of the application. In this specification we will refer to SR1 as a "rectification means" which includes any rectification device which conducts in one direction, and it is an open circuit when the current reverses.

Between t3 to t4 the current in the primary winding L1, 3010, is reduced to the magnetizing current. The voltage across the C1 continues to increase the magnetizing current into negative polarity. The longer the time interval between t3 to t4 the larger the decay of the magnetizing current.

Because the negative magnetizing current will charge the parasitic capacitance reflected in the switching node A,119 and will flow further through the body diode of M1, 3030 creating zero voltage switching condition somewhere in between t4 to t5, the time interval t3 to t4 is an element in the design.

At t5 the upper switch M1, 3030, is turned on at zero voltage switching conditions.

At t6 the magnetizing current, 5120, crosses zero and the cycle repeats again.

The operation in discontinuous mode depicted in FIG. 11C, hard switching for M1, 3030, may occur as depicted in FIG. 11C at t4. In FIG. 11C the M1,3030, switch is on in between t0 to t1, followed by a dead time from t1 to t2 further followed by the turning on of M2 switch, between t2 to t3. During the "extended dead time", which occurs after t3 there is an oscillation between the primary inductance L1, 3010 of the transformer Tr1, 3282 and the parasitic capacitance reflected in the switching node A, 119. The parasitic capacitance reflected in the switching node incorporates the parasitic capacitances of M1, 3030, and M2, 3040, and additional parasitic capacitance reflected across the primary winding of the transformer Tr1, 3282.

Figure 12A:
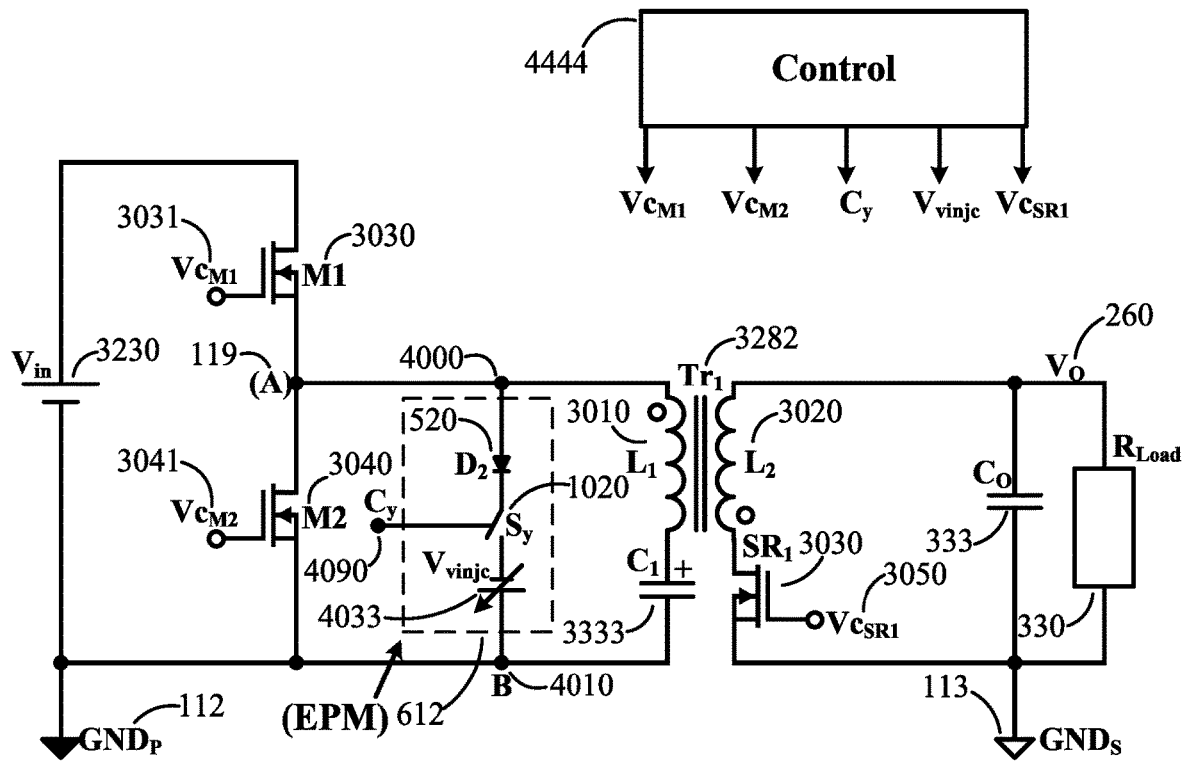
FIG. 12A depicts the flyback derived, single ended asymmetrical half bridge using the intelligent clamp circuit.

One of the embodiments of this specification is using the CEPM module, 612 and place CEPM module across M2, as depicted in FIG. 12A. The Controlled Energy Preservation Module, CEPM, 612, is composed by a unidirectional switch formed by diode D2, 520, a switch Sy, 1020 and a controlled voltage injection voltage source, Vvinjc, 4033. The CEPM module should be placed in between the switching node A and the source of M2, 3040, which is the input ground, GNDp, 112.

Figure 12B:
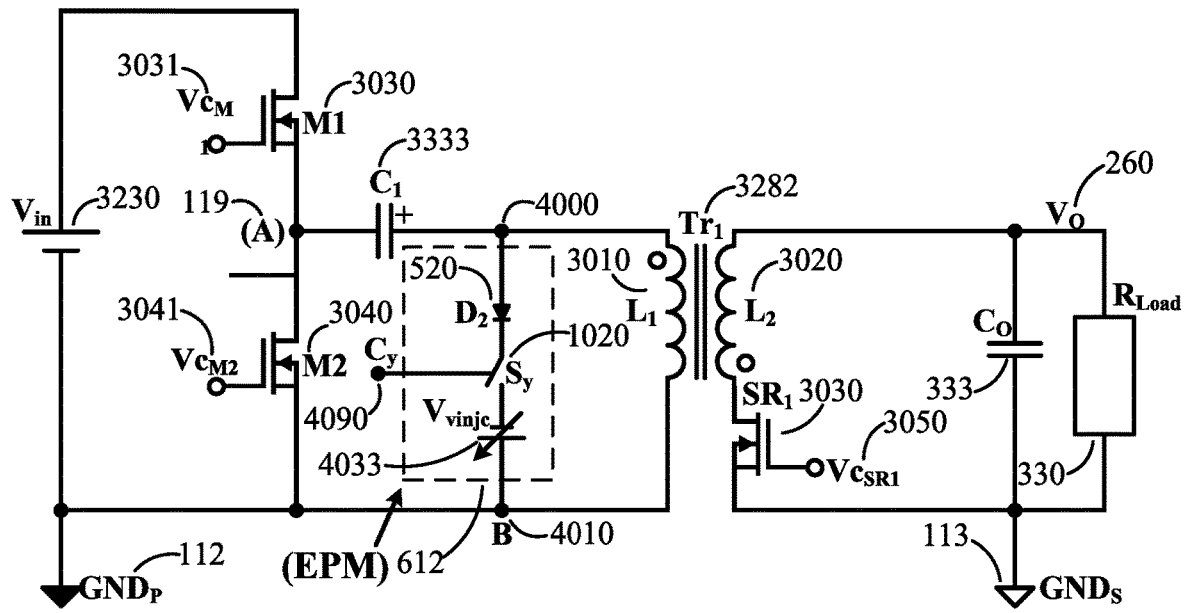
FIG. 12B depicts the flyback derived, single ended asymmetrical half bridge using the intelligent clamp circuit.

A preferred configuration is depicted in FIG. 12B. In the implementation of the FIG. 12B the voltage stress on the components in the CEPM is reduced.

Figure 12C:
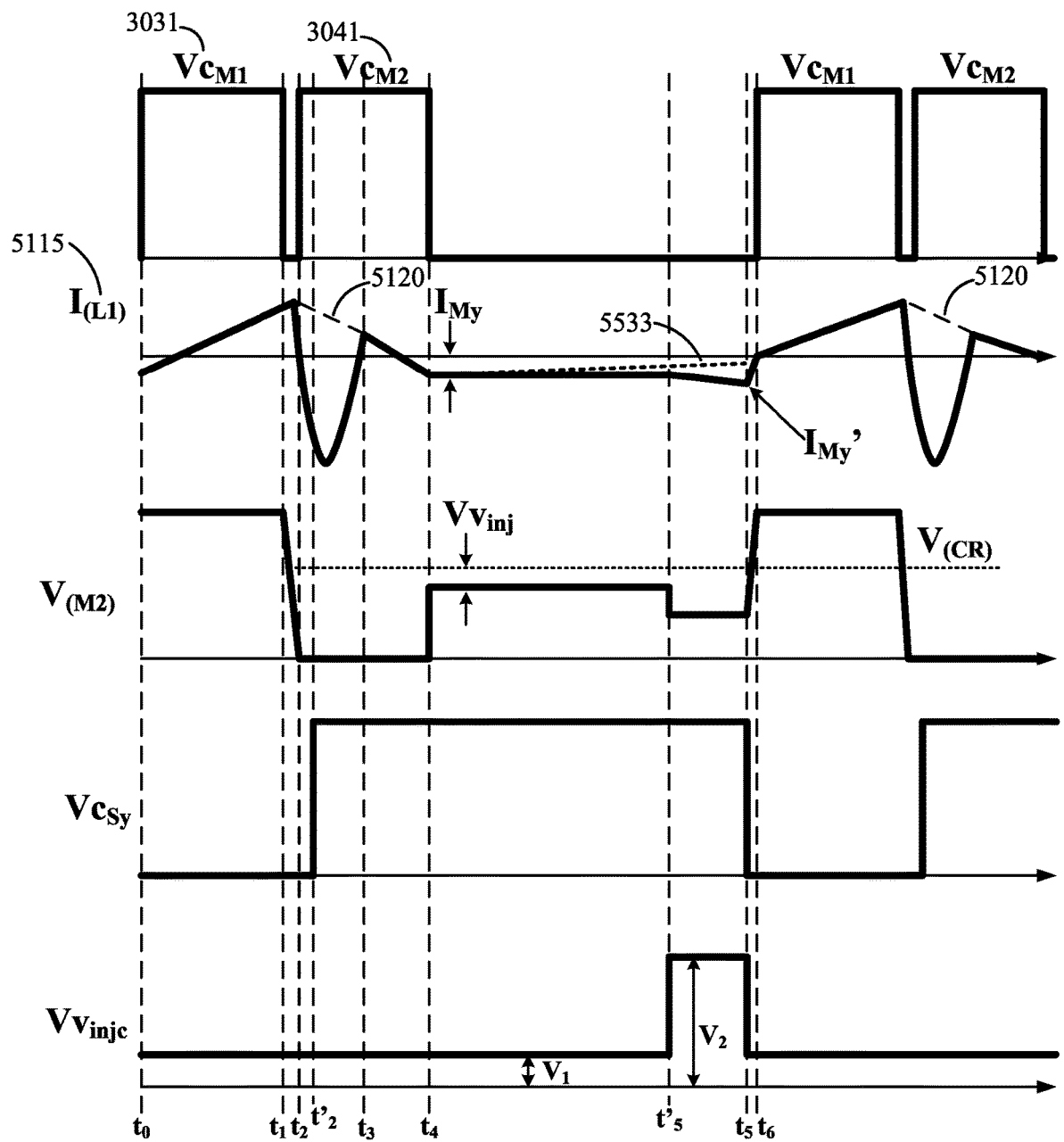
FIG. 12C depicts the key waveforms from the circuit from FIG. 12B.

In FIG. 12C are presented the key waveforms associated with the circuit presented in FIG. 12A and FIG. 12B.

As presented in FIG. 12C in between t0 to t1 the upper switch M1, 3030 is turned on. During this time period the current builds up via the primary winding L1, 3010, the current in L1, 5115 during t0 to t1 represents the magnetizing current through the transformer Tr1, 3282. In between t0 to t1 energy is transferred from Vin, 3230 to the magnetizing current of the transformer and in charging the capacitor C1.

At t1, M1, 3030 turns off and the current flowing through L1, 3010 will start flowing through M2, initially through the body diode and at t2, M2, 3040 is turned on.

As previously mentioned, the control signal for the control of Sy it is complementary to the control signal of the first switch, which in this topology is M1, 3030 with a dead time in between, in this case the dead time is the time interval between t1 to t2' and the time interval between t5 to t6.

During t2 to t3 a quasi-resonant current pulse is flowing from the primary winding to the secondary winding, quasi-resonant current produced by the resonant circuit formed by the leakage inductance in between L1 and L2, and the capacitor C1, 3333. Via said quasi-resonant current, a quantum of energy is transferred from primary to secondary. The magnetizing current 5120 continues to flow into the primary winding further until t4, when the magnetizing current has a negative polarity, IMy.

Sy switch, 1020 is turned on sometimes between t2 to t4 at t2'.

At t4 the lower switch M2, 3040 will turn off. In the circuit from FIG. 11A parasitic oscillations would occur in the switching node A, 119 and also reflected in the magnetizing current as is depicted in FIG. 11C. The CEPM module from FIG. 12A creates a low impedance path via D2 and Sy and Vvinjc of the CEPM. The magnetizing current IMy will start flowing via D2, Sy and Vvinjc and the energy contained on the parasitic oscillations is converted in the magnetic energy via the magnetizing current IMy. If the value of the Vvinjc is low or zero, the IMy would decrease in amplitude due to the conduction losses, as depicted by the dotted line, 5533. The value of Vvinjc can be chosen by different criteria function of the designer goals. For example, the value of the Vvinjc can be chosen to keep the amplitude of the magnetizing current IMy constant during the extended dead time. Another criteria is to modulate the value of Vvinj in such way that at the end of the extended dead time the amplitude of IMy is sufficient to discharge the parasitic capacitance reflected in the switching nod A, to create zero voltage switching conditions for M1, at t6 when the upper switch M1, 3030 turns on.

In FIG. 12C is presented such a concept wherein the Vvinjc which has a constant amplitude. To minimize the conduction losses during the extended dead time, the amplitude of the IMx has to be kept low and prior t5, the amplitude of the negative magnetizing current IMy can be increased by increasing the amplitude of the Vvinjc.

In FIG. 12C are depicted the key waveforms of the circuit presented in FIG. 12A and FIG. 12B. In FIG. 12C the value of Vvinjc is V1 between t0 to t5', and is chosen in such way that the amplitude of the magnetizing current IMy to be constant.

At t5' the amplitude of Vvinjc changes from V1 to V2 and the magnetizing current amplitude increases from IMy to IMy' which has the necessary amplitude that at t5 to discharge the parasitic capacitance reflected in A, 119, and create zero voltage switching conditions for M2 at t6. In FIG. 3D, 3E, 3F are presented several solutions wherein the amplitude of Vvinjc can be modulated.

Figure 13A:
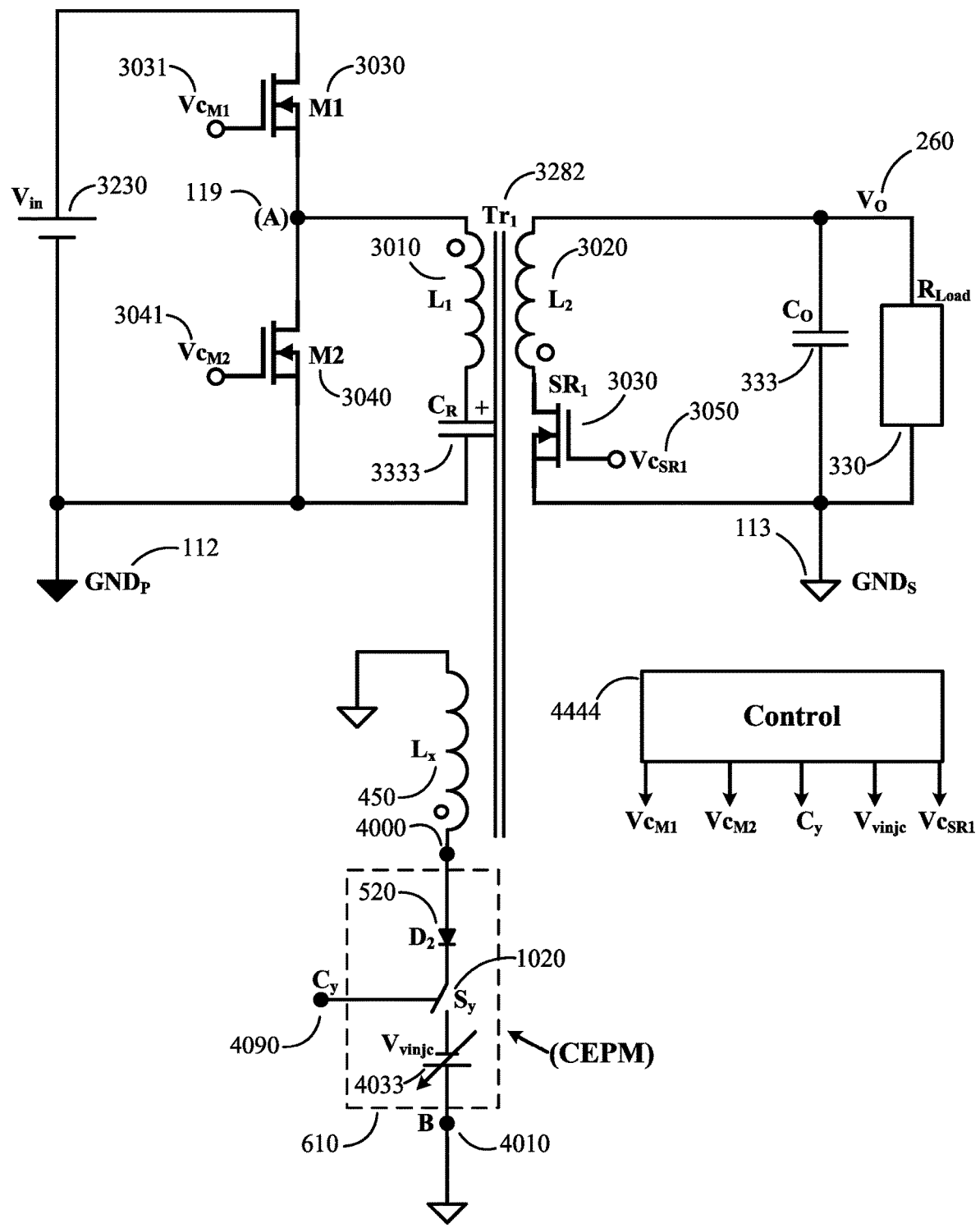
FIG. 13A depicts the flyback derived, single ended asymmetrical half bridge using the intelligent clamp circuit placed on an auxiliary winding.

In FIG. 13A is presented another method of connecting the CEPM module via an auxiliary winding Lx which is tightly coupled with L1 and L2 on the transformer Tr1. This mode of connection has the advantage of using lower voltage components as part of the module CEPM and easier to drive the Sy, 1020 wherein silicon mosfets or GaN or SiC devices are used.

In this topology the IMy can be tailored to have a certain value in such way that if Vvinc is chosen to keep the amplitude constant, at t5 the amplitude of the magnetizing current IMy' is sufficient to obtain zero voltage switching for M1 at t6.

In another embodiment of this specification, we can combine the CEPM module with CIM like in flyback topology. In such case the Vvinjc can be small or even zero and the current injection pulse will be initiated prior the turn on of M1 at t6. The combination of CEPM and CIM will work very well due to the amplitude self-adjusting feature of the CIM, and in some applications Vinjc of the CEPM can be zero for simplicity.

The CIM module can operate also in continuous mode in application wherein IMy will not have the necessary amplitude for turning on M1 at zero voltage switching.

In conclusion the two modules, CEPM and CIM can operate independently or together in all the topologies, isolated and non-isolated and ensure the zero voltage operation in any operating conditions.

Having a low amplitude Vvinjc such as maintain negative magnetizing current constant and Current injection using CIM can ensure a very efficiency operation in this topology and any other topology which has dead time with parasitic oscillations.

What is claimed is:

1. A switching power conversion apparatus, for converting power from an input voltage source to a load, comprising:
    a first switch connected to a switching node;
    a second switch connected to the switching node, wherein the second switch is turned on after the first switch turns off;
    an inductive element having a magnetizing current connected to the switching node, wherein the inductive element is connected to deliver energy via the first and second switches from the input voltage to the load during a succession of power conversion cycles;
    a capacitance connected to the switching node wherein the capacitance is configured to resonate with the inductive element during a portion of the power conversion cycles to cause a parasitic oscillation unrelated to the power conversion cycles;
    a clamp subcircuit placed across the inductive element containing an auxiliary switch to trap energy in the inductive element and prevent the parasitic oscillation, wherein the auxiliary switch is complementary to the first switch; and
    a controlled voltage source, controlled in an amplitude and a duration of the amplitude, to inject energy in the inductive element to control an amplitude of the magnetizing current of the inductive element at a determined level, at a time when the auxiliary switch turns off to discharge the parasitic capacitance to a given voltage by using trapped energy in the inductive element in addition to injected energy from the controlled voltage source.

2. The switching power conversion apparatus of claim 1, wherein the inductive element comprises a choke.

3. The switching power conversion apparatus of claim 2, wherein the switching power conversion apparatus is a non-isolated boost converter containing a power switch and a rectifier means, wherein the power switch is the first switch and the rectifier means is a secondary switch.

4. The switching power conversion apparatus of claim 2, wherein the switching power conversion apparatus is a non-isolated buck converter containing a power switch and a rectifier means, wherein the power switch which is the first switch and the rectifier means is a secondary switch.

5. The switching power conversion apparatus of claim 1, wherein:
    the inductive element comprises a transformer, and the transformer contains a primary winding, at least one secondary winding, and auxiliary windings; and
    the clamp subcircuit is placed across the primary winding.

6. The switching power conversion apparatus of claim 5, wherein the transformer is part of a flyback converter.

7. The switching power conversion apparatus of claim 5, wherein the transformer is part of a forward converter.

8. The switching power conversion apparatus of claim 5, wherein the transformer is part of a half bridge converter.

9. The switching power conversion apparatus of claim 5, wherein the transformer is part of a full bridge converter.

10. The switching power conversion apparatus of claim 1 wherein the inductive element comprises a transformer containing a primary winding, at least one secondary winding, and auxiliary windings, and the clamp subcircuit is placed across the auxiliary winding.

11. The switching power conversion apparatus of claim 10, wherein the transformer is part of a flyback converter.

12. The switching power conversion apparatus of claim 10, wherein the transformer is part of a forward converter.

13. The switching power conversion apparatus of claim 10, wherein the transformer is part of a half bridge converter.

14. The switching power conversion apparatus of claim 10, wherein the transformer is part of a full bridge converter.

15. A switching power conversion apparatus, for converting power from an input voltage source to a load, comprising:
    a first switch connected to a switching node;
    a second switch connected to the switching node wherein the second switch is turned on after the first switch turns off;
    an inductive element connected to the switching node, wherein the inductive element is connected to deliver energy via the first and second switches from the input voltage to the load during a succession of power conversion cycles;
    the switching node is a primary winding of a transformer, the transformer having at least a secondary winding and at least an auxiliary winding;
    a current injection circuit containing a current injection switch, a current injection diode, and a current injection voltage source connected across an auxiliary winding, wherein the current injection switch is turned on prior to the first switch turning on and is turned off after the first switch is turned on;
    a current injection capacitor connected between a termination of the current injection switch which is not connected to the auxiliary winding and a cathode of the current injection diode;
    a capacitance connected to the switching node, wherein the capacitance is configured to resonate with the inductive element during a portion of the power conversion cycles to cause a parasitic oscillation unrelated to the power conversion cycles;

a clamp subcircuit placed across the primary winding containing an auxiliary switch to trap energy in the inductive element and prevent the parasitic oscillation, wherein the auxiliary switch is complementary to the first switch; and a controlled voltage source to inject energy in the inductive element to control amplitude of a magnetizing current of the inductive element at a determined level, when the auxiliary switch turns off to discharge the parasitic capacitance to a given voltage by using trapped energy in the inductive element in addition to injected energy from the controlled voltage source.

16. The switching power conversion apparatus of claim 15, wherein the transformer is part of a flyback converter.

17. The switching power conversion apparatus of claim 15, wherein the transformer is part of a forward converter.

18. The switching power conversion apparatus of claim 15, wherein the transformer is part of a half bridge converter.

19. The switching power conversion apparatus of claim 15, wherein the transformer is part of a full bridge converter.

20. A switching power conversion apparatus, for converting power from an input voltage source to a load, comprising:

a first switch connected to a switching node;

a second switch connected to the switching node wherein the second switch is turned on after the first switch turns off;

an inductive element connected to the switching node, wherein the inductive element is connected to deliver energy via the first and second switches from the input voltage to the load during a succession of power conversion cycles;

the switching node is a primary winding of a transformer, the transformer having at least a secondary winding, and having first and second auxiliary windings;

a current injection circuit containing a current injection switch, a current injection diode, and a current injection voltage source connected across the first auxiliary winding, wherein the current injection switch is turned on prior to the first switch turning on and is turned off after the first switch is turned on;

a current injection capacitor connected between a termination of the current injection switch which is not connected to the first auxiliary winding and a cathode of the current injection diode;

a capacitance connected to the switching node, wherein the capacitance is configured to resonate with the inductive element during a portion of the power conversion cycles to cause a parasitic oscillation unrelated to the power conversion cycles, and a clamp subcircuit placed across the second auxiliary winding containing an auxiliary switch to trap energy in the inductive element and prevent the parasitic oscillation; wherein the auxiliary switch is complementary to the first switch; and a controlled voltage source to inject energy in the inductive element to control amplitude of a magnetizing current of the inductive element at a determined level, when the auxiliary switch turns off to discharge the parasitic capacitance to a given voltage by using trapped energy in the inductive element in addition to injected energy from said controlled voltage source.

21. The switching power conversion apparatus of claim 20, wherein the transformer is part of a flyback converter.

22. The switching power conversion apparatus of claim 20, wherein the transformer is part of a forward converter.

23. The switching power conversion apparatus of claim 20, wherein the transformer is part of a half bridge converter.

24. The switching power conversion apparatus of claim 20, wherein the transformer is part of a full bridge converter.

* * * * *